United States Patent [19]
Sato et al.

[11] Patent Number: 6,014,680
[45] Date of Patent: Jan. 11, 2000

[54] METHOD AND APPARATUS FOR GENERATING STRUCTURED DOCUMENT

[75] Inventors: Yoshifumi Sato, Yokohama; Masatoshi Hino, Zama, both of Japan

[73] Assignee: Hitachi, Ltd., Tokyo, Japan

[21] Appl. No.: 08/697,782

[22] Filed: Aug. 29, 1996

[30] Foreign Application Priority Data

Aug. 31, 1995 [JP] Japan .................................. 7-223017

[51] Int. Cl.[7] .................................................. G06F 17/27
[52] U.S. Cl. ............................................................ 707/513
[58] Field of Search ..................................... 707/513, 510

[56] References Cited

U.S. PATENT DOCUMENTS

| | | | |
|---|---|---|---|
| 5,587,902 | 12/1996 | Kugimiya ................................. | 77/513 |
| 5,655,130 | 8/1997 | Dodge et al. ........................... | 707/513 |
| 5,669,005 | 9/1997 | Curbow et al. ........................ | 707/513 |
| 5,669,007 | 9/1997 | Tateishi .................................. | 707/513 |
| 5,694,609 | 12/1997 | Murata .................................... | 707/513 |
| 5,920,879 | 7/1999 | Kyojima et al. ........................ | 707/517 |
| 5,956,726 | 9/1999 | Aoyama et al. ........................ | 77/102 |

OTHER PUBLICATIONS

JP–A–62–249270.
JP–A–6–290173.
SGML: Martin Bryan, An Authors Guide to the Standard Generalized Mark up Language (Addison–Wesley Publishers 1988).
Saitoh Japanese hiterature "How to use yaac and lex" publishing division.
Kernighan et al., "Programming Language C".
Conversion Method from Document Image to Logically Structured Document Based on ODA, by Mitsuru Yamada; Journal of Papers of IEICE D–11, vol. J76–D–11 No. 11 pp. 2274–2284, 1993.

*Primary Examiner*—Stephen S. Hong
*Assistant Examiner*—R Bourque
*Attorney, Agent, or Firm*—Antonelli, Terry, Stout & Kraus, LLP

[57] ABSTRACT

A structured document generating method and apparatus capable of easily generating a structured document matching the document structure of each non-structured document, by using a rule directly generated from a preset document structure definition for the conversion of the non-structured document into the structured document. A keyword extracting module extracts a keyword representative of the document structure from a non-structured document by using a keyword extracting rule, and a keyword/text model is generated which is described by two elements including keywords and other strings. A parsing module generated by a process of automatically parsing the document structure by referring to a parsing rule generated by modifying and converting DTD, performs a parsing process relative to the keyword/text model to generate an interim SGML document. An SGML document correcting module modifies the interim SGML document and generates a final output of an SGML document by referring to DTD different information generated when the parsing rule was generated.

9 Claims, 37 Drawing Sheets

FIG.2

○△△ PREFECTURE FLOOD DEFENCE SIGNAL REGULATION
SHOWA 24, OCTOBER, 6
△△ PREFECTURE REGULATION NO. 78

△△ PREFECTURE FLOOD DEFENCE SIGNAL REGULATION IS TO BE PROMULGATED AS IN THE FOLLOWING

△△ PREFECTURE FLOOD DEFENCE SIGNAL REGULATION

ARTICLE 1   FLOOD DEFENCE SIGNALS STIPULATED IN ARTICLE 13, PARAGRAPH 1 OF THE FLOOD DEFENCE LAW SHOWA 24, JUNE, LAW NO. 193) INCLUDE THE FOLLOWING.

(1) FIRST SIGNAL : FOR NOTIFYING AN ALARM WATER LEVEL (2) SECOND SIGNAL : FOR NOTIFYING THAT ALL PERSONS OF FLOOD DEFENCE MEMBERS AND THOSE BELONGING TO FIRE STATIONS ARE TO BE DISPATCHED (3) THIRD SIGNAL : FOR NOTIFYING THAT RESIDENTS IN A DISTRICT OF THE FLOOD DEFENCE SUPERVISING FACILITY ARE TO BE DISPATCHED (4) FOURTH SIGNAL : FOR NOTIFYING THAT RESIDENTS IN DISTRICTS WHERE NECESSARY ARE TO BE DEPARTED FOR REFUGE

ARTICLE 2   THE FLOOD DEFENCE SIGNAL IS ISSUED IN ACCORDANCE WITH THE DIVISION AND METHOD STIPULATED IN A SEPARATE TABLE.

FIG.3

| LINE NUMBER | | | |
|---|---|---|---|
| 1 | <!DOCTYPE | LAW [ | |
| 2 | <!ELEMENT | LAW | (PROMULGATION, ESTABLISHEDREGULATIONNO., TITLE, PRESENTREGULATION) |
| 3 | <!ELEMENT | PROMULGATION | (PROMULGATIONSTATEMENT, PROMULGATIONDATE, PROMULGATIONOFFICER) |
| 4 | <!ELEMENT | PROMULGATIONSTATEMENT | (#PCDATA) |
| 5 | <!ELEMENT | PROMULGATIONDATE | (#PCDATA) |
| 6 | <!ELEMENT | PROMULGATIONOFFICER | (OFFICIAL TITLE, NAME) |
| 7 | <!ELEMENT | OFFICIALTITLE | (#PCDATA) |
| 8 | <!ELEMENT | NAME | (#PCDATA) |
| 9 | <!ELEMENT | ESTABLISHEDREGULATIONNO. | (#PCDATA) |
| 10 | <!ELEMENT | TITLE | (#PCDATA) |
| 11 | <!ELEMENT | PRESENTREGULATION | (ARTICLE+) |
| 12 | <!ELEMENT | ARTICLE | (ARTICLE NO., ARTICLESTATEMENT, PARAGRAPH*) |
| 13 | <!ELEMENT | ARTICLENO. | (#PCDATA) |
| 14 | <!ELEMENT | ARTICLESTATEMENT | (#PCDATA) |
| 15 | <!ELEMENT | PARAGRAPH | (PARAGRAPH NO., PARAGRAPHSTATEMENT) |
| 16 | <!ELEMENT | PARAGRAPHNO. | (#PCDATA) |
| 17 | <!ELEMENT | PARAGRAPHSTATEMENT | (#PCDATA) |
| 18 | ]> | | |

FIG.5

| LINE NUMBER | # KEYWORD | FORMAT CONDITIONS |
|---|---|---|
| 1 | OPENINGTITLE | ^SPC3 "○" + ("LAW" : "REGULATION") $ ; |
| 2 | PROMULGATIONSTATEMENT | ^SPC1 + ("TO BE PROMULGATED AS IN THE FOLLOWING." : "TO BE DETERMINED AS IN THE FOLLOWING.) |
| 3 | TITLE | ^SPC3 + ("LAW" : "REGULATION") $ ; |
| 4 | PROMULGATIONDATE | !("TAISHO" : "SHOWA") NUM1 "YEAR" NUM1 "MONTH" NUM1 "DAY" $ ; |
| 5 | ESTABLISHEDREGULATIONNO. | !"△△PREFECTURE" + ("LAW" : "REGULATION") "PARAGRAPH" NUM1 "NO." $ ; |
| 6 | ARTICLENO. | ^ "PARAGRAPH" NUM1 "ARTICLE" SPC1 ; |
| 7 | PARAGRAPHNO. | ^SPC1 "(" NUM1 ")" SPC1 ; |

FIG.6

| CONSTITUENT | MEANING |
|---|---|
| ^ | LINE START. |
| $ | LINE END. IF SPC IS NOT JUST BEFORE, OPTIONAL NUMBER OF SPACES TO LINE END. |
| "..." | STRING. STRING IS DESCRIBED BETWEEN DOUBLE QUOTATIONS. |
| NUM{NUMERAL} | NUM1 → INTEGER, NUM2 → KATAKANA, NUM3 → SMALL ALPHABET. |
| SPC{NUMERAL} | {NUMERAL}-SPACE. |
| ! | OPTIONAL SPACES FROM LINE START. |
| C | CENTERED KEYWORD. |
| ? | OPTIONAL ONE CHARACTER. |
| + | OPTIONAL CHARACTER STRING OF ONE OR MORE CHARACTERS. |
| ({CONSTITUENT}:{CONSTITUENT}) | OR OF CONSTITUENTS. |
| ({CONSTITUENT TRAIN}) | ONLY PORTION SURROUNDED BY "[" AND "]" IS EXTRACTED AS KEYWORD. |

FIG.7

| LINE NO. | | |
|---|---|---|
| 1 | OPENINGTITLE | [ ○△△ PREFECTURE FLOOD DEFENCE SIGNAL REGULATION] |
| 2 | TITLE | [ ○△△ PREFECTURE FLOOD DEFENCE SIGNAL REGULATION] |
| 3 | PROMULGATIONDATE | [SHOWA 24, OCTOBER, 6] |
| 4 | ESTABLISHEDREGULATIONNO. | [△△ PREFECTURE REGULATION NO.78] |
| 5 | PROMULGATIONSTATEMENT | [△△ PREFECTURE FLOOD DEFENCE SIGNAL REGULATION IS TO BE PROMULGATED AS IN THE FOLLOWING.]] |
| 6 | TITLE | [△△ PREFECTURE FLOOD DEFENCE SIGNAL REGULATION] |
| 7 | ARTICLENO. | [ARTICLE 1] |
| 8 | PARAGRAPHNO. | [ (1) ] |
| 9 | PARAGRAPHNO. | [ (2) ] |
| 10 | PARAGRAPHNO. | [ (3) ] |
| 11 | PARAGRAPHNO. | [ (4) ] |
| 12 | ARTICLENO. | [ARTICLE 2] |

FIG.8

| LINE NO. | | |
|---|---|---|
| 1 | [OPENINGTITLE] | ○△△ PREFECTURE FLOOD DEFENCE SIGNAL REGULATION |
| 2 | [PROMULGATIONDATE] | SHOWA 24, OCTOBER, 6 |
| 3 | [ESTABLISHEDREGULATIONNO.] | △△ PREFECTURE REGULATION NO. 78 |
| 4 | [PROMULGATIONSTATEMENT] | △△ PREFECTURE FLOOD DEFENCE SIGNAL REGULATION IS TO BE PROMULGATED AS IN THE FOLLOWING. |
| 5 | [TITLE] | △△ PREFECTURE FLOOD DEFENCE SIGNAL REGULATION |
| 6 | [ARTICLENO.] | ARTICLE 1 |
| 7 | [TEXT] | FLOOD DEFENCE SIGNALS STIPULATED IN ARTICLE 13, PARAGRAPH 1 OF THE FLOOD DEFENCE LAW (SHOWA 24, JUNE, LAW NO. 193) INCLUDE THE FOLLOWING. |
| 8 | [PARAGRAPHNO.] | (1) |
| 9 | [TEXT] | FIRST SIGNAL : FOR NOTIFYING AN ALARM WATER LEVEL |
| 10 | [PARAGRAPHNO.] | (2) |
| 11 | [TEXT] | SECOND SIGNAL : FOR NOTIFYING THAT ALL PERSONS OF FLOOD DEFENCE MEMBERS AND THOSE BELONGING TO FIRE STATIONS ARE TO BE DISPATCHED |
| 12 | [PARAGRAPHNO.] | (3) |
| 13 | [TEXT] | THIRD SIGNAL : FOR NOTIFYING THAT RESIDENTS IN A DISTRICT OF THE FLOOD DEFENCE SUPERVISING FACILITY ARE TO BE DISPATCHED |
| 14 | [PARAGRAPHNO.] | (4) |
| 15 | [TEXT] | FOURTH SIGNAL : FOR NOTIFYING THAT RESIDENTS IN DISTRICTS WHERE NECESSARY ARE TO BE DEPARTED FOR REFUGE |
| 16 | [ARTICLENO.] | ARTICLE 2 |
| 17 | [TEXT] | THE FLOOD DEFENCE SIGNAL IS ISSUED IN ACCORDANCE WITH THE DVISION AND METHOD STIPULATED IN A SEPARATE TABLE. |

FIG.11

```
<!DOCTYPE CHANGE [
<!ELEMENT CHANGE                    (PROMULGATION, ESTABLISHEDREGULATIONNO., TITLE)
<!ELEMENT PROMULGATION              (PROMULGATIONSTATEMENT, PROMULGATIONDATE, PROMULGATIONOFFICER)
<!ELEMENT PROMULGATIONSTATEMENT     (#PCDATA)
<!ELEMENT PROMULGATIONDATE          (#PCDATA)
<!ELEMENT PROMULGATIONOFFICER       (OFFICIALTITLE, NAME)
<!ELEMENT OFFICIALTITLE             (#PCDATA)
<!ELEMENT NAME                      (#PCDATA)
<!ELEMENT ESTABLISHEDREGULATIONNO.  (#PCDATA)
<!ELEMENT TITLE                     (#PCDATA)
]>
```

FIG.13

| LINE NUMBER | | |
|---|---|---|
| 1 | LAW : | CHANGE, PRESENTREGULATION ; |
| 2 | CHANGE : | OPENINGTITLE, PROMULGATION, TITLE ; |
| 3 | OPENINGTITLE : | #KEY 「OPENINGTITLE」 ; |
| 4 | PROMULGATION : | PROMULGATIONDATE, ESTABLISHEDREGULATIONNO., opt0 ; |
| 5 | opt0 : | : PROMULGATIONSTATEMENT |
| 6 | PROMULGATIONDATE : | #KEY 「PROMULGATIONDATE」 ; |
| 7 | ESTABLISHEDREGULATIONNO. : | #KEY 「ESTABLISHEDREGULATIONNO.」 ; |
| 8 | PROMULGATIONSTATEMENT : | #KEY 「PROMULGATIONSTATEMENT」 ; |
| 9 | TITLE : | #KEY 「TITLE」 ; |
| 10 | PRESENTREGULATION : | plus0 ; |
| 11 | plus0 : | ARTICLE : plus0 ARTICLE ; |
| 12 | ARTICLE : | ARTICLENO., ARTICLESTATEMENT, rep0 ; |
| 13 | ARTICLENO. : | #KEY 「ARTICLENO.」 ; |
| 14 | ARTICLESTATEMENT : | #TEXT ; |
| 15 | rep0 : | : rep0 PARAGRAPH ; |
| 16 | PARAGRAPH : | PARAGRAPHNO., PARAGRAPHSTATEMENT |
| 17 | PARAGRAPHNO. : | #KEY 「PARAGRAPHNO.」 ; |
| 18 | PARAGRAPHSTATEMENT : | #TEXT ; |

FIG.14

```
LAW : CHANGE PRESENTREGULATION
{
    Stream_array [0] = $1 ;
    Stream_array [1] = $2 ;
    $$ = setTagInfo (Stream_array,2," LAW ") ;
}
;

CHANGE : OPENINGTITLE, PROMULGATIONTITLE
{
    Stream_array [0] = $1 ;
    Stream_array [1] = $2 ;
    Stream_array[2]=$3;
    $$ = setTagInfo (Stream_array,3,"CHANGE") ;
}
;
```

INSERTED C LANGUAGE PROGRAMS

FIG.15

```
       < LAW >
       < CHANGE >
       < OPENINGTITLE >
       ○△△PREFECTURE FLOOD DEFENCE SIGNAL REGULATION
       </ OPENINGTITLE >
1501 ──< PROMULGATION >
1502 ──< PROMULGATIONDATE >
       SHOWA 24, OCTOBER, 6
1503 ──</ PROMULGATIONDATE >
       < ESTABLISHEDREGULATIONNO. >
       △△PREFECTURE REGULATION NO. 78
       </ ESTABLISHEDREGULATIONNO. >
1504 ──< PROMULGATIONSTATEMENT >
       △△PREFECTURE FLOOD DEFENCE SIGNAL REGULATION IS
       TO BE PROMULGATED AS IN THE FOLLOWING
1505 ──</ PROMULGATIONSTATEMENT >
1506 ──</ PROMULGATION >
       < TITLE >
       △△PREFECTURE FLOOD DEFENCE SIGNAL REGULATION
       </ TITLE >
       </ CHANGE >
       < PRESENTREGULATION >
       < ARTICLE >
       < ARTICLENO. >
       ARTICLE 1
       </ ARTICLENO. >
       < FIRSTPARAGRAPH >
       < FIRSTPARAGRAPHSTATEMENT >
         FLOOD DEFENCE SIGNALS STIPULATED IN ARTICLE 13,
       PARAGRAPH 1 OF THE FLOOD DEFENCE LAW
       ( SHOWA 24, JUNE, LAW NO. 193 ) INCLUDE THE FOLLWING.
       </ FIRSTPARAGRAPHSTATEMENT >
       < PARAGRAPH >
       < PARAGRAPHNO. >
       ( 1 )
       </ PARAGRAPHNO. >
       < PARAGRAPHSTATEMENT >
         FIRST SIGNAL : FOR NOTIFYING AN ALARM WATER LEVEL
       </ PARAGRAPHSTATEMENT >
       </ PARAGRAPH >
```

FIG.17

```
< LAW >
< PROMULGATION >
 < PROMULGATIONSTATEMENT >
  △△PREFECTURE FLOOD DEFENCE SIGNAL REGULATION IS
   TO BE PROMULGATED AS IN THE FOLLOWING
 < / PROMULGATIONSTATEMENT >
 < PROMULGATIONDATE >
  SHOWA 24, OCTOBER, 6
 < / PROMULGATIONDATE >
 < PROMULGATIONOFFICER >
  < OFFICIALTITLE >
   [ NONE ]
  < / OFFICIALTITLE >
  < NAME >
   [ NONE ]
  < / NAME >
 < / PROMULGATIONOFFICER >
< / PROMULGATION >
< ESTABLISHEDREGULATIONNO. >
 △△PREFECTURE REGULATION NO. 78
< / ESTABLISHEDREGULATIONNO. >
< TITLE >
 △△PREFECTURE FLOOD DEFENCE SIGNAL REGULATION
< / TITLE >
< PRESENTREGULATION >
 < ARTICLE >
  < ARTICLENO. >
   ARTICLE 1
  < / ARTICLENO. >
  < FIRSTPARAGRAPH >
   < FIRSTPARAGRAPHSTATEMENT >
    FLOOD DEFENCE SIGNALS STIPULATED IN ARTICLE 13,
PARAGRAPH 1 OF THE FLOOD DEFENCE LAW
( SHOWA 24, JUNE, LAW NO. 193 ) INCLUDE THE FOLLWING.
   < / FIRSTPARAGRAPHSTATEMENT >
   < PARAGRAPH >
    < PARAGRAPHNO. >
     ( 1 )
    < / PARAGRAPHNO. >
    < PARAGRAPHSTATEMENT >
     FIRST SIGNAL : FOR NOTIFYING AN ALARM WATER LEVEL
    < / PARAGRAPHSTATEMENT >
```

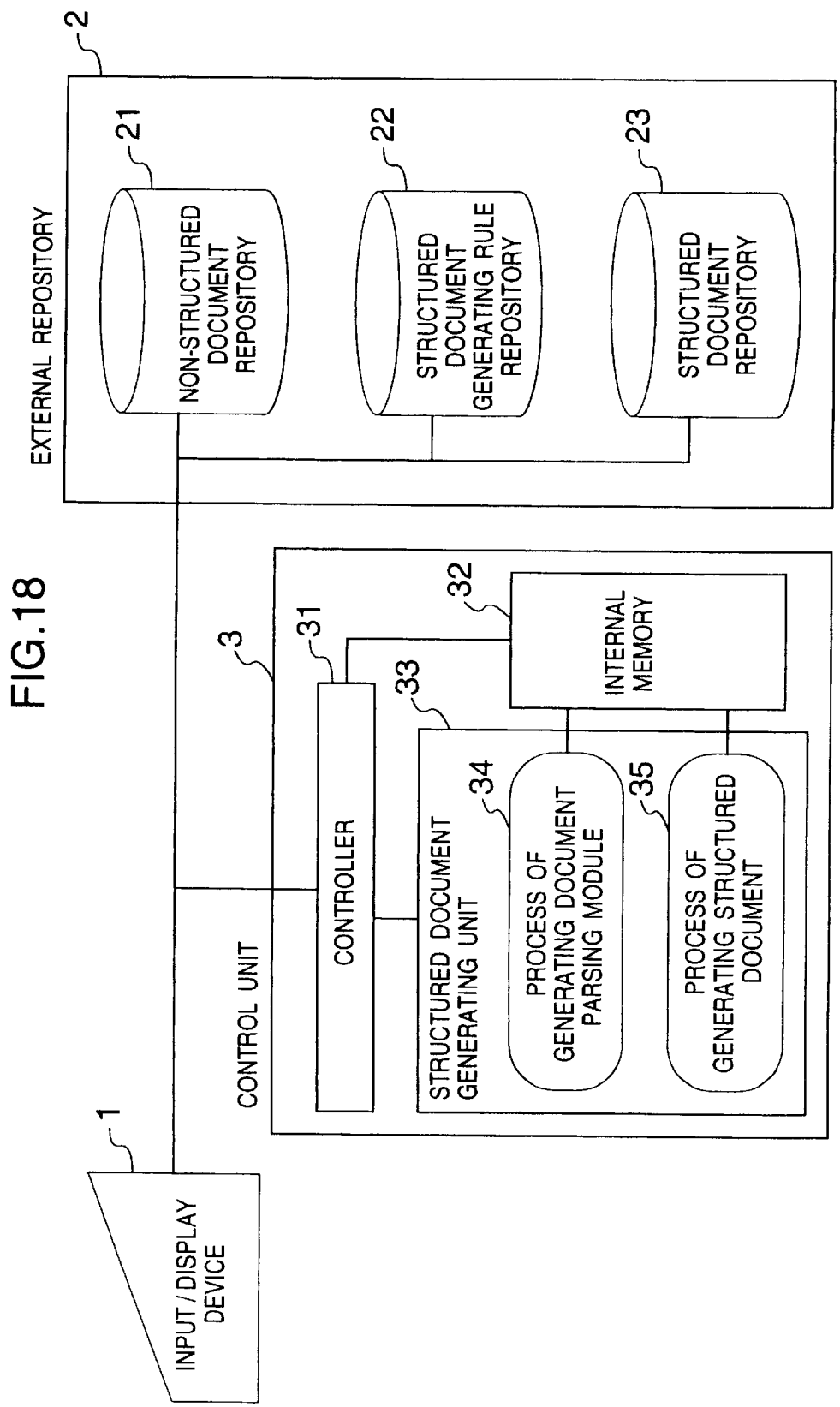

FIG.20

| LINE NO. | | |
|---|---|---|
| 1 | [OPENING TITLE] | ○△△ PREFECTURE FLOOD DEFENCE SIGNAL REGULATION |
| 2 | | PRE-TAG : <OPENINGTITLE : START> <CHANGE : START> <LAW : START> |
| 3 | | POST-TAG : <OPENINGTITLE : END> |
| 4 | [PROMULGATION DATE] | SHOWA 24. OCTOBER. 6 |
| 5 | | PRE-TAG : <PROMULGATIONDATE : START> <PROMULGATION : START> |
| 6 | | POST-TAG : <PROMULGATIONDATE : END> |
| 7 | [ESTABLISHED REGULATION NO.] | △△ PREFECTURE REGULATION NO. 78 |
| 8 | | PRE-TAG : <ESTABLISHEDREGULATIONNO : START> |
| 9 | | POST-TAG : <ESTABLISHEDREGULATIONNO : END> |
| 10 | [PROMULGATION STATEMENT] | △△ PREFECTURE FLOOD DEFENCE SIGNAL REGULATION IS TO BE PROMULGATED AS IN THE FOLLOWING. |
| 11 | | PRE-TAG : <PROMULGATIONSTATEMENT : START> |
| 12 | | POST-TAG : <PROMULGATIONSTATEMENT : END> <LAW : END> |
| 13 | | △△ PREFECTURE FLOOD DEFENCE SIGNAL REGULATION |
| 14 | [TITLE] | |
| 15 | | PRE-TAG : <TITLE : START> |
| 16 | | POST-TAG : <TITLE : END> <CHANGE : END> |
| 17 | [ARTICLE NO.] | ARTICLE 1 |
| 18 | | PRE-TAG : <ARTICLENO : START> <ARTICLE : START> <PRESENTREGULATION : START> |
| 19 | | POST-TAG : <ARTICLENO : END> |
| 20 | | FLOOD DEFENCE SIGNALS STIPULATED IN ARTICLE 13. PARAGRAPH 1 OF THE FLOOD DEFENCE LAW |
| 21 | | (SHOWA 24. JUNE. LAW NO. 193) INCLUDE THE FOLLWING. |
| 22 | | PRE-TAG : <ARTICLESTATEMENT : START> |
| 23 | | POST-TAG : <ARTICLESTATEMENT : END> |
| 24 | [PARAGRAPH NO.] | (1) |
| 25 | | PRE-TAG : <PARAGRAPHNO : START> <PARAGRAPH : START> |
| 26 | | POST-TAG : <PARAGRAPHNO : END> |
| 27 | [TEXT] | FIRST SIGNAL : FOR NOTIFYING AN ALARM WATER LEVEL |
| 28 | | PRE-TAG : <PARAGRAPHSTATEMENT : START> |
| | | POST-TAG : <PARAGRAPHSTATEMENT : END> <PARAGRAPH : END> |

FIG.22

```
<!DOCTYPE LAW [
<!ELEMENT LAW              (CHANGE, PRESENTREGULATION)
<!ELEMENT CHANGE           (OPENINGTITLE, PROMULGATION, TITLE)
<!ELEMENT OPENINGTITLE     (#PCDATA)
<!ELEMENT PROMULGATION     (PROMULGATIONDATE, ESTABLISHEDREGULATIONNO, PROMULGATIONSTATEMENT, ?)
<!ELEMENT PROMULGATIONDATE (#PCDATA)
<!ELEMENT ESTABLISHEDREGULATION NO. (#PCDATA)
<!ELEMENT PROMULGATIONSTATEMENT (#PCDATA)
<!ELEMENT TITLE            (#PCDATA)
<!ELEMENT PRESENTREGULATION (ARTICLE+)
<!ELEMENT ARTICLE          (ARTICLENO., ARTICLESTATEMENT, PARAGRAPH)
<!ELEMENT ARTICLENO.       (#PCDATA)
<!ELEMENT ARTICLESTATEMENT (#PCDATA)
<!ELEMENT PARAGRAPH        (PARAGRAPHNO., PARAGRAPHSTATEMENT)
<!ELEMENT PARAGRAPHNO.     (#PCDATA)
<!ELEMENT PARAGRAPHSTATEMENT (#PCDATA)
]>
```

STRING-CORRESPONDING ELEMENT
STRING-CORRESPONDING ELEMENT
STRING-CORRESPONDING ELEMENT
STRING-CORRESPONDING ELEMENT

FIG.23

| | | |
|---|---|---|
| 2401 | LAW | : CHANGE, PRESENTREGULATION |
| 2402 | CHANGE | : OPENINGTITLE, PROMULGATION, TITLE ; |
| 2403 | OPENINGTITLE | : #PCDATA |
| 2404 | PROMULGATION | : PROMULGATIONDATE, ESTABLISHEDREGULATIONNO., opt0 |
| 2405 | opt0 | : : PROMULGATIONSTATEMENT |
| 2406 | PROMULGATIONDATE | : #PCDATA |
| 2407 | ESTABLISHEDREGULATIONNO. | : #PCDATA |
| 2408 | PROMULGATIONSTATEMENT | : #PCDATA |
| 2409 | TITLE | : #PCDATA |
| 2410 | PRESENTREGULATION | : plus0 |
| 2411 | plus0 | : ARTICLE : plus0ARTICLE |
| 2412 | ARTICLE | : ARTICLENO., ARTICLESTATEMENT, rep0 |
| 2413 | ARTICLE NO. | : #PCDATA |
| 2414 | ARTICLESTATEMENT | : #PCDATA |
| 2415 | rep0 | : : rep0 PARAGRAPH |
| 2416 | PARAGRAPH | : PARAGRAPHNO., PARAGRAPHSTATEMENT |
| 2417 | PARAGRAPHNO. | : #PCDATA |
| 2418 | PARAGRAPHSTATEMENT | : #PCDATA |

FIG.25

| | |
|---|---|
| First [ LAW ] | = { OPENING TITLE } |
| First [ CHANGE ] | = { OPENING TITLE } |
| First [ OPENING TITLE ] | = { OPENING TITLE } |
| First [ PROMULGATION ] | = { PROMULGATION DATE } |
| First [ opt0 ] | = { PROMULGATION STATEMENT } |
| First [ PROMULGATION DATE ] | = { PROMULGATION DATE } |
| First [ ESTABLISHED REGULATION NO. ] | = { ESTABLISHED REGULATION NO. } |
| First [ PROMULGATION STATEMENT ] | = { PROMULGATION STATEMENT } |
| First [ TITLE ] | = { TITLE } |
| First [ PRESENT REGULATION ] | = { ARTICLE NO. } |
| First [ plus0 ] | = { ARTICLE NO. } |
| First [ ARTICLE ] | = { ARTICLE NO. } |
| First [ ARTICLE NO. ] | = { ARTICLE NO. } |
| First [ ARTICLE STATEMENT ] | = { ARTICLE STATEMENT } |
| First [ rep0 ] | = { PARAGRAPH NO. } |
| First [ PARAGRAPH ] | = { PARAGRAPH NO. } |
| First [ PARAGRAPH NO. ] | = { PARAGRAPH NO. } |
| First [ PARAGRAPH STATEMENT ] | = { PARAGRAPH STATEMENT } |

| | |
|---|---|
| First [ LAW ] | = { ARTICLE NO. ARTICLE STATEMENT } |
| First [ CHANGE ] | = { TITLE } |
| First [ OPENING TITLE ] | = { OPENING TITLE } |
| First [ PROMULGATION ] | = { PROMULGATION STATEMENT, ESTABLISHED REGULATION NO. } |
| First [ opt0 ] | = { PROMULGATION STATEMENT } |
| First [ PROMULGATION DATE ] | = { PROMULGATION DATE } |
| First [ ESTABLISHED REGULATION NO. ] | = { ESTABLISHED REGULATION NO. } |
| First [ PROMULGATION STATEMENT ] | = { PROMULGATION STATEMENT } |
| First [ TITLE ] | = { TITLE } |
| First [ PRESENT REGULATION ] | = { ARTICLE STATEMENT, PARAGRAPH STATEMENT } |
| First [ plus0 ] | = { ARTICLE STATEMENT, PARAGRAPH STATEMENT } |
| First [ ARTICLE ] | = { ARTICLE STATEMENT, PARAGRAPH STATEMENT } |
| First [ ARTICLE NO. ] | = { ARTICLE NO. } |
| First [ ARTICLE STATEMENT ] | = { ARTICLE STATEMENT } |
| First [ rep0 ] | = { PARAGRAPH STATEMENT } |
| First [ PARAGRAPH ] | = { PARAGRAPH STATEMENT } |
| First [ PARAGRAPH NO. ] | = { PARAGRAPH NO. } |
| First [ PARAGRAPH STATEMENT ] | = { PARAGRAPH STATEMENT } |

FIG.27

| | STRING-CORRESPONDING ELEMENT NAME | STRING-CORRESPONDING ELEMENT NAME CAPABLE OF BEING BACKWARD CONTIGUOUS |
|---|---|---|
| 2801 | OPENING TITLE | PROMULGATION DATE |
| 2802 | PROMULGATION DATE | ESTABLISHED REGULATION NO. |
| 2803 | ESTABLISHED REGULATION NO. | PROMULGATION STATEMENT, TITLE |
| 2804 | PROMULGATION STATEMENT | TITLE |
| 2805 | TITLE | ARTICLE NO. |
| 2806 | ARTICLE NO. | ARTICLE STATEMENT |
| 2807 | ARTICLE STATEMENT | ARTICLE NO., PARAGRAPH NO. |
| 2808 | PARAGRAPH NO. | PARAGRAPH STATEMENT |
| 2809 | PARAGRAPH STATEMENT | ARTICLE NO., PARAGRAPH NO. |

FIG.28

| | | |
|---|---|---|
| 2901 — | TITLE { | |
| 2902 — | [ FONT NAME ] | GOTHIC |
| 2903 — | [ FONT SIZE ] | 12pt |
| 2904 — | [ CHARACTER PITCH ] | 14pt |
| 2905 — | [ OFFSET 1 ] | 0pt |
| 2906 — | [ OFFSET 2 ] | 0pt |
| 2907 — | [ FIRST LINE DISPLACEMENT ] | 0pt |
| 2908 — | [ CONNECTION WITH PREVIOUS ELEMENT ] | "¥n" |
| 2909 — | [ STRING INFORMATION ] | CONTENT |
| 2910 — | [ PLACEMENT ] center | center |
| 2911 — | } | |
| | | |
| 2912 — | ARTICLE NO. { | |
| 2913 — | [ FONT NAME ] | GOTHIC |
| 2914 — | [ FONT SIZE ] | 10pt |
| 2915 — | [ CHARACTER PITCH ] | 12pt |
| 2916 — | [ OFFSET 1 ] | 12pt |
| 2917 — | [ OFFSET 2 ] | 0pt |
| 2918 — | [ FIRST LINE DISPLACEMENT ] | 0pt |
| 2919 — | [ CONNECTION WITH PREVIOUS ELEMENT ] | "¥n" |
| 2920 — | [ STRING INFORMATION ] | CONTENT |
| 2921 — | [ PLACEMENT ] center | start |
| 2922 — | } | |
| | | |
| 2923 — | ARTICLE STATEMENT { | |
| 2924 — | [ FONT NAME ] | MING |
| 2925 — | [ FONT SIZE ] | 10pt |
| 2926 — | [ CHARACTER PITCH ] | 12pt |
| 2927 — | [ OFFSET 1 ] | 12pt |
| 2928 — | [ OFFSET 2 ] | 0pt |
| 2929 — | [ FIRST LINE DISPLACEMENT ] | 0pt |
| 2930 — | [ CONNECTION WITH PREVIOUS ELEMENT ] | "  " |
| 2931 — | [ STRING INFORMATION ] | CONTENT |
| 2932 — | [ PLACEMENT ] center | start |
| 2933 — | } | |

FIG.29

| | ITEM NAME | USABLE SORT OF VALUE |
|---|---|---|
| 3001 | [ELEMENT NAME] | STRING |
| 3002 | [LEFT-HAND SPACE] | INTEGER (UNIT NUMBER OF CHARACTERS) |
| 3003 | [RIGHT-HAND SPACE] | INTEGER (UNIT NUMBER OF CHARACTERS) |
| 3004 | [FIRST-LINE INDENT] | INTEGER (UNIT NUMBER OF CHARACTERS) |
| 3005 | [STRING CONDITION] | STRING |
| 3006 | [ARRANGEMENT] | RIGHT JUSTIFY OR LEFT JUSTIFY OR CENTERING OR EQUAL SPACE |
| 3007 | [PREVIOUS STRING] | STRING |
| 3008 | [NEXT STRING] | STRING |

FIG.30

| | REQUIRED ITEM | INFORMATION IN LAYOUT DEFINITION |
|---|---|---|
| 3101 | [LEFT-HAND SPACE] | [OFFSET 1]/[CHARACTER PITCH] |
| 3102 | [RIGHT-HAND SPACE] | [OFFSET 2]/[CHARACTER PITCH] |
| 3103 | [FIRST-LINE INDENT] | {[OFFSET 1]+[FIRST-LINE INDENT]}/[CHARACTER PITCH] |
| 3104 | [STRING CONDITION] | [STRING INFORMATION] |
| 3105 | [ARRANGEMENT]<br>RIGHT JUSTIFY ←<br>LEFT JUSTIFY ←<br>CENTERING ←<br>EQUAL SPACE ← | [PLACEMENT]<br>— start<br>— end<br>— center<br>— justify |
| 3106 | [PREVIOUS STRING] | [CONNECTION WITH PREVIOUS ELEMENT] |
| 3107 | [NEXT STRING] | CONTENT IS OBTAINED BY USING STRING-CORRESPONDING ELEMENT INFORMATION AND [CONNECTION WITH PREVIOUS ELEMENT] (REFER TO SPECIFICATION) |

FIG.33
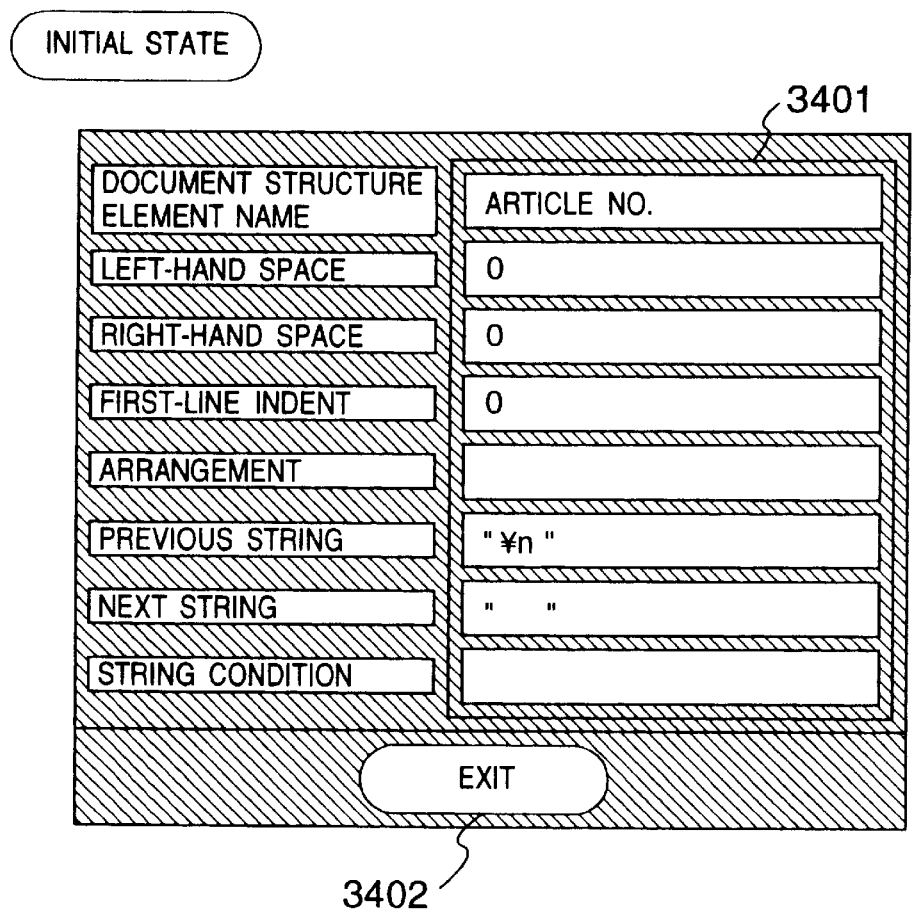
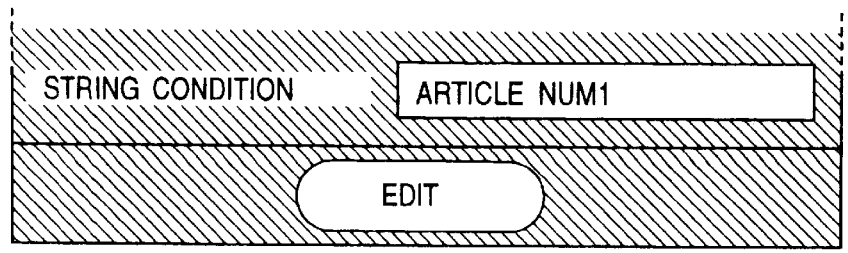
SUPPLEMENTARY INFORMATION EDITING MODULE INTERFACE

METHOD AND APPARATUS FOR GENERATING STRUCTURED DOCUMENT

CROSS-REFERENCE TO RELATED APPLICATIONS

This application relates to a U.S. application Ser. No. 08/657,306 filed by Y. AOYAMA et al on Jun. 3, 1996 now U.S. Pat. No. 5,956,726, entitled "Method and Apparatus for Structured Document Difference String Extraction" and assigned to the present assignee. The disclosure of that application is incorporated herein by reference.

BACKGROUND OF THE INVENTION

1. Field of the Invention

The present invention generally relates to management of documents having a regular document format such as legal documents, and particularly to a method and apparatus for generating a structured document from a non-structured document. The "non-structured document" means a document which does not contain information explicitly showing the structure of a document entered through character recognition, a word processor, or the like. The "structured document" is a document which contains information explicitly showing the structure of the document.

2. Description of the Related Art

In a known method of generating a structured document, information explicitly showing the document structure is embedded in a text. Generally, a document generated by a user (hereinafter called a "document instance") often contains a portion for designating a file which describes a document structure definition and a text content portion. The document structure definition defines the document structure and a mark indicating an element (the mark is hereinafter called a "tag"). The document structure definition is often set in order to efficiently use a document to be structured. The tag defined by the document structure definition is inserted into the text content portion in order to explicitly express the document structure and uniquely determine a string which is an element of the document structure indicated by the tag.

In outputting a document instance structured in the above manner, an image to be output is generated by referring to a file which describes a layout definition defining what format is used for outputting each component (hereinafter called an "element") of the document structure. In this method, the document instance and the layout definition are independent so that any document instance can be used irrespective of the type of an apparatus or system to be used for the output.

The contents of a string of a structured document are explicitly expressed by inserting a tag such as <author name> and <title> which is in one-to-one correspondence with an element. Therefore, in combination with a tool such as a full text search system for structured documents, an aggregation of document instances themselves can be used as a database, and the document contents can be added or changed easily. Even if part of this database is lost by some failure, it is possible to know that this database has a lost portion, by comparing the original document structure definitions with the database of document instances.

Because of these advantages, structured documents are widely used for document management of a document processing system which stores and uses a large number of documents. Along with this, several approaches have been proposed to convert a non-structured document such as already present paper documents and documents entered by a word processor, into a structured document.

JP-A-62-249270 and "Method of Converting Document Image into ODA Structured Document" (Journal of Papers of The Institute of Electronics, Information and Communication Engineers, D-11 Vol. J76-D11 No. 11 pp. 2274–2284) propose the following method. First, the field of a document type of a document is restricted. Next, a structured document is generated by using a document structure common in the restricted field (hereinafter called a "common document structure") and a document structure analysis rule.

With this method, the document structure usable in common in each field of a document such as "technical document" and "business document" is set. Then, the document structure analysis rule is manually generated in order to analyze a non-structured document and extract a document structured of it. By using the document structure analysis rule, the non-structured document is converted into a document instance matching the common document structure. If there is an element, which is specific to each document structure and unable to be expressed by the common document structure (hereinafter called an "individual document structure"), the document instance matching the common document structure is converted into a document instance matching the individual document structure.

With this method, however, the document structure subjected to the document structure analysis and the document structure analysis rule are dependent upon the field of a non-structured document. Therefore, in order to process a document in a different field, the document structure analysis rule for this field is required to be newly generated manually. This work requires a large amount of labor.

This method uses a single document structure analysis rule considered to have high commonness in a plurality type of documents in a specific field. Therefore, this single document structure analysis rule is not always optimum to each document and an element specific to an individual document structure cannot be analyzed directly. In this case, it becomes necessary after the document structure analysis to convert again the document instance into another document instance matching the individual document structure. Specifically, tags of the first generated document instance are added, changed, or deleted. This work generally requires complicated operations and hence a large amount of labor.

Further, this method does not consider a support to generate a rule for extracting a keyword. Therefore, an element as a keyword is required to be manually determined and the conditions of layout and string necessary for extracting a keyword is also required to be manually set.

Still further, this method does not provide means for supporting to determine an element as a keyword (hereinafter called a "keyword-corresponding element"). Elements which contain string data are not always extracted as keywords. Elements having no characteristic layout or string are not extracted as keywords, but they are dealt as a string between keywords, i.e., a non-keyword.

The restriction condition that "non-keywords should not be contiguous in a document instance" is imposed when which element is determined to be a keyword-corresponding element. This is because the non-keyword is a "string between keywords" and the non-keyword is required to be always contiguous to a keyword. However, conventional methods have no means for automatically checking whether an aggregation of elements determined as keyword-corresponding elements satisfies the restriction condition. If the aggregation of these keyword-corresponding elements does not satisfy the restriction condition, some defective or erroneous conditions occur when the rule for document structure analysis is generated or when the document structure is analyzed. It is therefore necessary to determine again keyword-corresponding elements. This cycle is required to be repeated until an aggregation of proper keyword-corresponding elements is set.

Lastly, this method does not support to set the conditions of layout and string necessary for the extraction of a keyword. It is therefore necessary to manually collect information necessary for the extraction of a keyword from a non-structured document itself or rules or the like defining the format of the non-structured document. This requires a large amount of labor.

JP-A-6-290173 gives the following description. A document structure indicating each element of a labeled document is generated by referring to a "schema" describing restricting information of the document structure, and then a structured document is generated.

In JP-A-6-290173, however, although use of the schema describing restricting information of the document structure is described, how the schema is generated is not described.

SUMMARY OF THE INVENTION

It is an object of the invention to solve the above problems and enable proper document structure analysis of documents of a plurality of fields.

It is another object of the invention to directly analyze elements specific to the individual document structure and enable to directly generate a document instance matching the individual document structure.

It is a further object of the invention to support to generate a rule for extracting a keyword.

In order to achieve the above objects, the invention provides a method of generating a structured document for a structured document generating apparatus having at least an input/output device, a control unit, and a repository wherein a non-structured document not explicitly given the document structure and input from the input/output device is converted into a structured document explicitly given the document structure, in accordance with a document structure definition defining the document structure, the method comprising the steps of: modifying a given first document structure definition so as to match the document structure of the input non-structured document and generate a second document structure definition; the control unit generating a parsing rule used for performing a parsing process suitable for the document structure of the second document structure definition, by modifying marks constituting the second document structure definition and modifying the second document structure definition so as to make the positional order of the marks in one-to-one correspondence; in accordance with the generated parsing rule, generating a first structured document from the input non-structured document; and in accordance with difference data between the first document structure definition and the second document structure definition, converting the generated first structured document into a format matching the first document structure definition to thereby generate a second structured document.

With the above configuration, conversion from the non-structured document to the structured document can be performed, for example, by a parsing module which analyzes the document structure through parsing on the basis of extracted keywords. The parsing module is generated by converting a given document structure definition into a parsing rule by means of a parsing rule generating module, and by subjecting this parsing rule to a process of automatically generating a parsing module.

In the process of automatically generating a parsing module, an aggregation of rules such as "A is constituted by patterns B, C, . . . " is input and a program for executing a parsing process in accordance with these rules is output. A particular process to be executed when each rule is satisfied can be described in this program. Such a process of automatically generating a parsing module may be yacc, for example.

With the above configuration, if the same string in the same string region is extracted as a plurality of different keywords, the parsing module of the control unit selects a proper one from the plurality of keywords in accordance with whether the parsing process succeeds or fails.

A method of generating a structured document is performed in practice as in the following. First, a keyword extraction module extracts a keyword from the non-structured document, and generates a keyword/text model of an abstract which represents the non-structured document as an aggregation of elements constituted by keywords and other strings.

The parsing module performs a parsing process relative to the keyword/text model to generate the structured document. The parsing module is generated by the parsing module in the following procedure. First, a given document structure definition is modified so as to match the document structure of the non-structured document, and difference therebetween is stored. Next, the parsing rule generating module converts the modified document structure definition into a parsing rule. In this case, when each rule is satisfied, i.e., when each element is detected, a program for recording information of the detected element in a corresponding position of the keyword/text model is embedded in the parsing rule. Then, the process of automatically generating a parsing module generates the parsing module which realizes the parsing process described in the parsing rule.

The parsing module generated in the above manner performs a parsing process relative to the keyword/text model generated by the keyword extracting module, and generates an interim structured document matching the modified document structure definition, in accordance with the parsing results recorded in the keyword/text model. A structured document correcting module refers to the difference stored when the document structure definition was modified, and output a structured document matching the document structure definition before modification.

A given layout definition and a second document structure definition support the generation of a keyword extraction rule used for extracting a keyword. The second document structure definition is generated by modifying a preset document structure definition so as to match the document structure of the input non-structured document.

Specifically, the keyword extracting module comprises: means for extracting layout information from the given layout definition, the layout information including information about layout and string used when each element of the document structure is output; means for extracting information of connection between elements from the second document structure definition; means for supporting a determination by a user of which element is extracted as the keyword, by using the information of connection between elements; and means for a user to edit layout information extracted from the layout definition so as to match the layout of the non-structured document.

The means for editing layout information comprises: means for notifying the layout information extracted for each element of the document structure to the user, the layout information being provided for each item necessary for extracting a keyword; and means for the user to modify the notified layout information so as to match the layout of the non-structured document or to supplement missing information.

With the above structure, the document structure and the rule for analyzing the document structure are generated by modifying the document structure definition preset for each document. Therefore, labor required for the design of the document structure for document structure analysis and required for generating the rule can be reduced. Since the parsing rule dynamically generated in accordance with the document structure definition of each document is used, it is possible to directly generate the structured document matching the individual document structure without using the common document structure, and it is not necessary to convert the structured document from the format matching the common document structure into the format matching the individual document structure.

BRIEF DESCRIPTION OF THE DRAWINGS

FIG. 2 is a diagram showing an example of a non-structured document.

FIG. 3 is a diagram showing part of DTD which is a document type definition of an SGML format set for the document shown in FIG. 2.

FIG. 5 is showing an example of a keyword extraction rule in part.

FIG. 6 is a diagram explaining a description constituent of the format condition of the keyword extraction rule shown in FIG. 5.

FIG. 7 shows an example of extracted keywords.

FIG. 8 shows an example of a keyword/text model.

FIG. 11 shows an example of DTD difference data.

FIG. 13 shows an example of an interim yacc rule in part.

FIG. 14 shows an example of a parsing rule in part.

FIG. 15 shows an example of an interim SGML document in part.

FIG. 17 shows an example of an SGML document finally generated by the embodiment method.

FIG. 18 is a block diagram showing the hardware structure of the structured document generation system of the first embodiment.

FIG. 20 shows an example of a keyword/text model with tag information being given.

FIG. 22 shows an example of extraction of string-corresponding elements.

FIG. 23 shows an example of the modified DTD shown in FIG. 10 described in BNF notation.

FIG. 25 shows string-corresponding elements capable of appearing at the start and end of each element in the modified DTD described in BNF notation shown in FIG. 23.

FIG. 27 shows an example of string-corresponding element information.

FIG. 28 shows an example of layout information.

FIG. 29 shows an example of required items necessary for extracting a keyword.

FIG. 30 shows an example of the process of extracting a required item from the layout definition.

FIG. 33 is a diagram showing an interface of a supplementary information editing module.

DESCRIPTION OF THE PREFERRED EMBODIMENTS

Embodiments of the invention will be described with reference to the accompanying drawings. In this embodiment, a structured document generating module analyzes a document structure through parsing. As the structured document format, an SGML (Standard Generalized Markup Language) format is adopted, and as the document structure definition, DTD (Document Type Definition) of an SGML document type definition is used. The process contents and description rules of SGML and DTD are stipulated in ISO (International Organization for Standardization) standards ISO8879. The details thereof are explained in "SGML: An Author's Guide to the Standard Generalized Markup Language", by Martin Bryan, Addison-Wesley, Publishers, 1988. In this embodiment, yacc is used in a process of automatically generating a parsing module. C language is used for describing a process to be added when each rule to be inputted to yacc is satisfied. The details of a yacc process are explained in a document "How to Use yacc and lex" by Takashi SAITHO, HBJ publishing division, and the C language is explained in a document "Programming Language C" by B. W. Kernighan and D. M. Ritchy, Kyoritsu Publishing Company.

Figure 19:
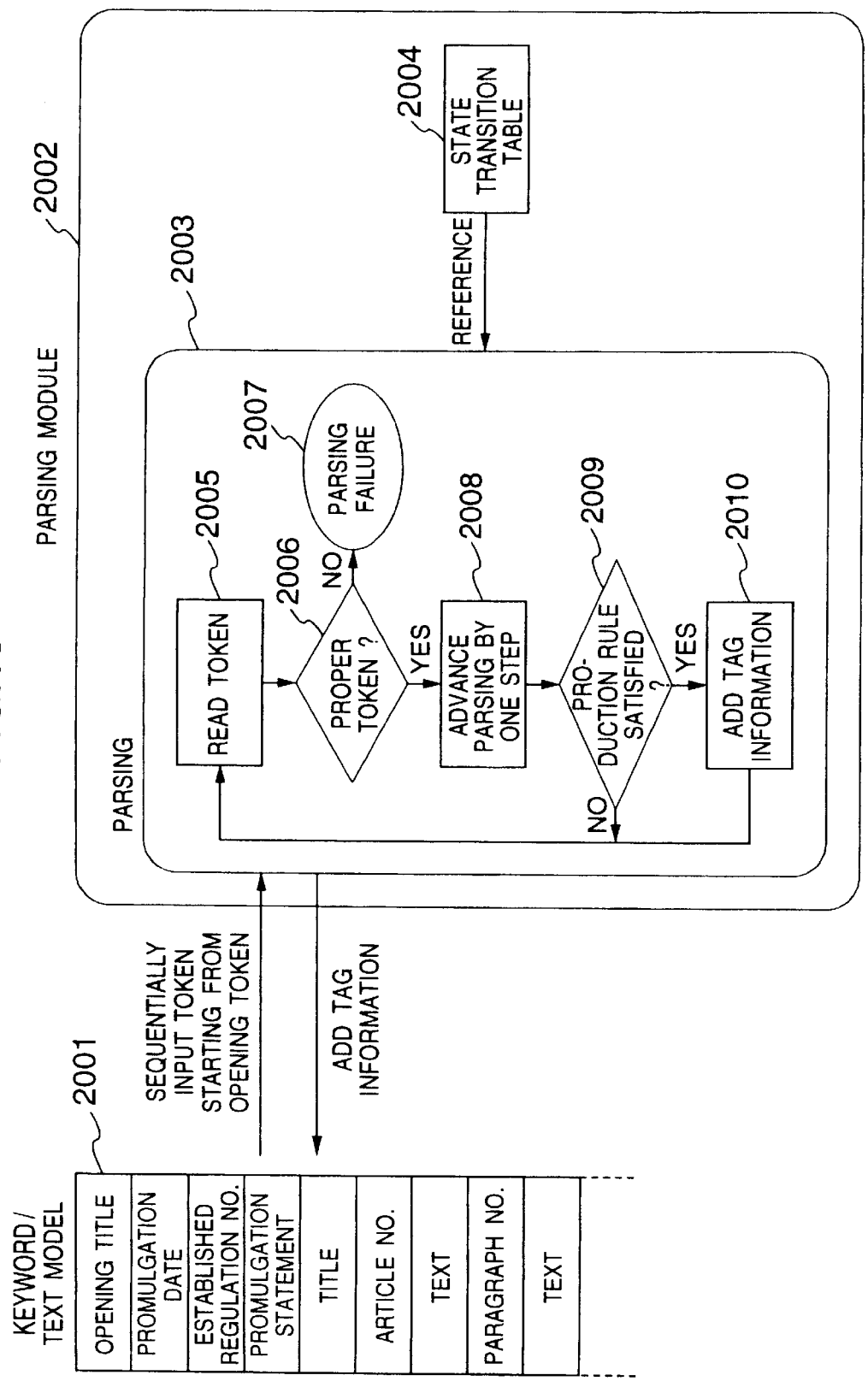
FIG. 19 is a diagram illustrating the process outline to be executed by the parsing module.

First, the outline of the first embodiment will be described. FIG. 19 is a diagram showing the hardware structure of a structured document generating system of the first embodiment. An input/display device 1 receives an input entered by a user and displays an input non-structured document, a generated structured document, or the like. The input/display device 1 is constituted by a display, a keyboard, a mouse, or the like. An external repository unit 2 stores a variety of data for structured document generation. This unit 2 is realized by a hard disk or the like and constituted by a non-structured document repository 21, a structured document generating rule repository 22, and a structured document repository 23. A control unit 3 controls each device constituting the system, processes information for structured document generation, and is constituted by a controller 31, an internal memory 32, and a structured document generating unit 33. The controller 31 reads data stored in the non-structured document repository 21 and structured document generating rule repository 22, develops it on the internal memory 32, executes processes of the structured document generating unit 33 on the internal memory 32 by using the developed data, and stores the generated structured document in the structured document repository 23. The processes to be executed include a process 34 of generating a parsing module and a process 35 of generating a structured document. The parsing module generating process 34 constitutes part of the structured document generating process 35. The structured document generating process 35 is a process of converting a non-structured document stored in the non-structured document repository 21 into a structured document by using a document structure definition, a keyword extraction rule, a rule conversion regulation, and the like respectively stored in the non-structured document repository 21. The parsing module generating process 34 and the structured document generating process 35 can be described by known programming languages.

Next, the outline of processes of the first embodiment will be described.

Figure 1:
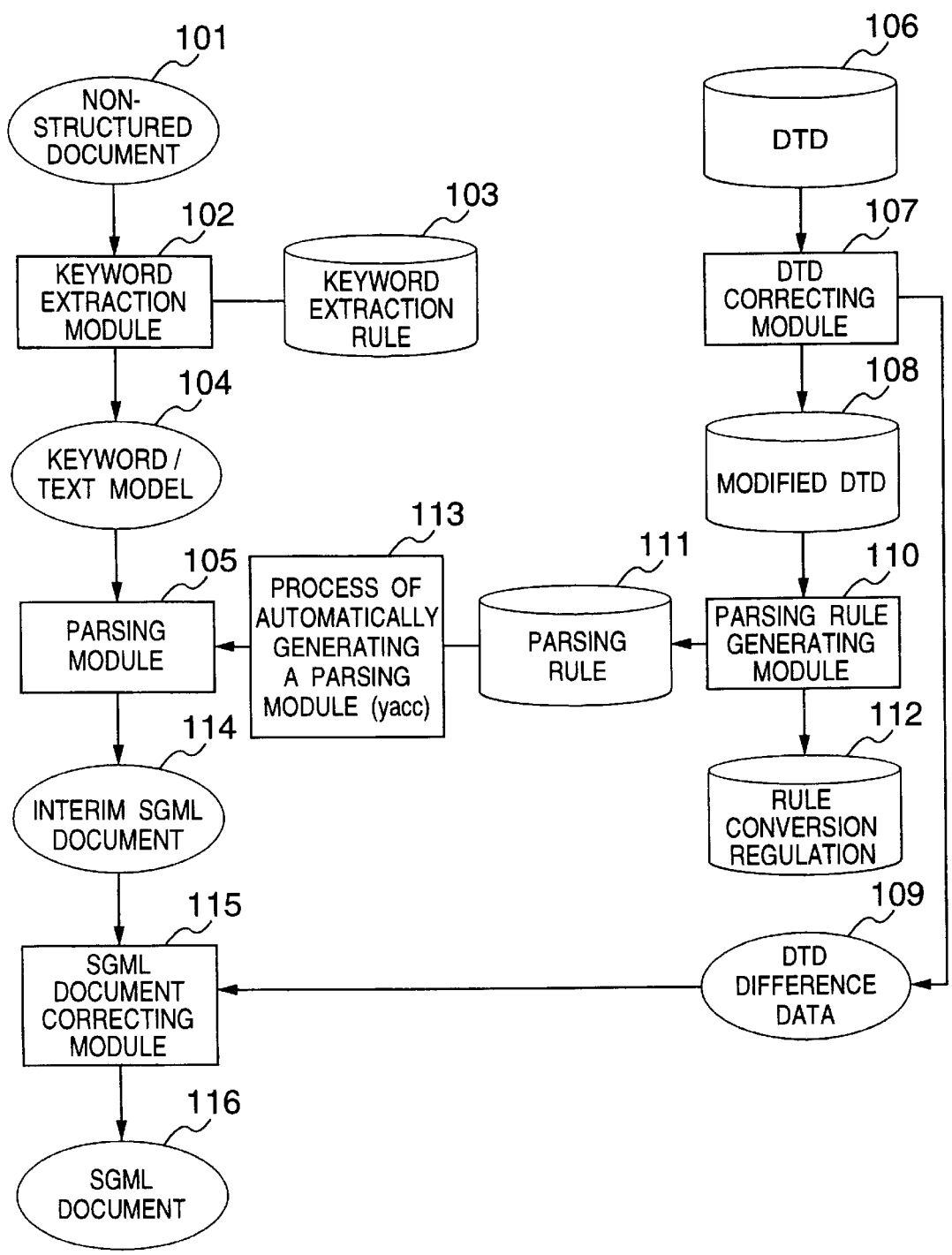
FIG. 1 is a block diagram illustrating the operation outline of a structured document generating system according to an embodiment of the invention.

FIG. 1 is a block diagram showing a flow of the structured document generating process of the structured document generating system of the embodiment. A non-structured document 101 is electronic document information of sequential character strings generated by a word processor, a character recognition apparatus, or the like, and is input to the system from the input/display device 1. A keyword extraction module 102 extracts a keyword from the non-structured document in accordance with a keyword extraction rule 103. A keyword is a character string expressing a document structure of the non-structured document 101. The keyword extraction module 102 then separates the non-structured document 101 into keywords and other strings and generates an abstract keyword/text model 104 as an aggregation of these elements of keywords and other strings. A parsing module 105 performs a parsing process described in a parsing rule 111 to analyze the document structure, the parsing rule 111 having been generated by a parsing rule generating module 110.

The outline of a method of generating the parsing module 105 is as follows. First, a DTD correcting module 107 modifies a DTD 106 to generate a modified DTD so as to match the description format of the non-structured document 101, and stores difference information as DTD difference data 109. DTD 106 is a prepared standard document type definition and does not necessarily match the input non-structured document 101. This modification is therefore performed in accordance with a comparison result by a system user between the non-structured document 101 and DTD 106. The parsing rule generating module 110 refers to a rule conversion regulation 112 and generates the parsing rule 111 from the modified DTD 108. Then, yacc 113, which is the process of generating a parsing module of this embodiment, generates the parsing module 105 in accordance with the parsing rule 111, the parsing module 105 realizing a parsing process described by the parsing rule 111.

The parsing module 105 performs a parsing process for the keyword/text model 104, and affixes a tag representative of the document structure to generate an interim SGML document 114. This document is a document instance formed in conformity with the modified DTD 108. Therefore, by referring to the DTD difference data 109, an SGML document correcting module 115 modifies the interim SGML document 114 to generate an SGML document 116 matching DTD 106.

Each process of the embodiment will be detailed next.

Figure 4:
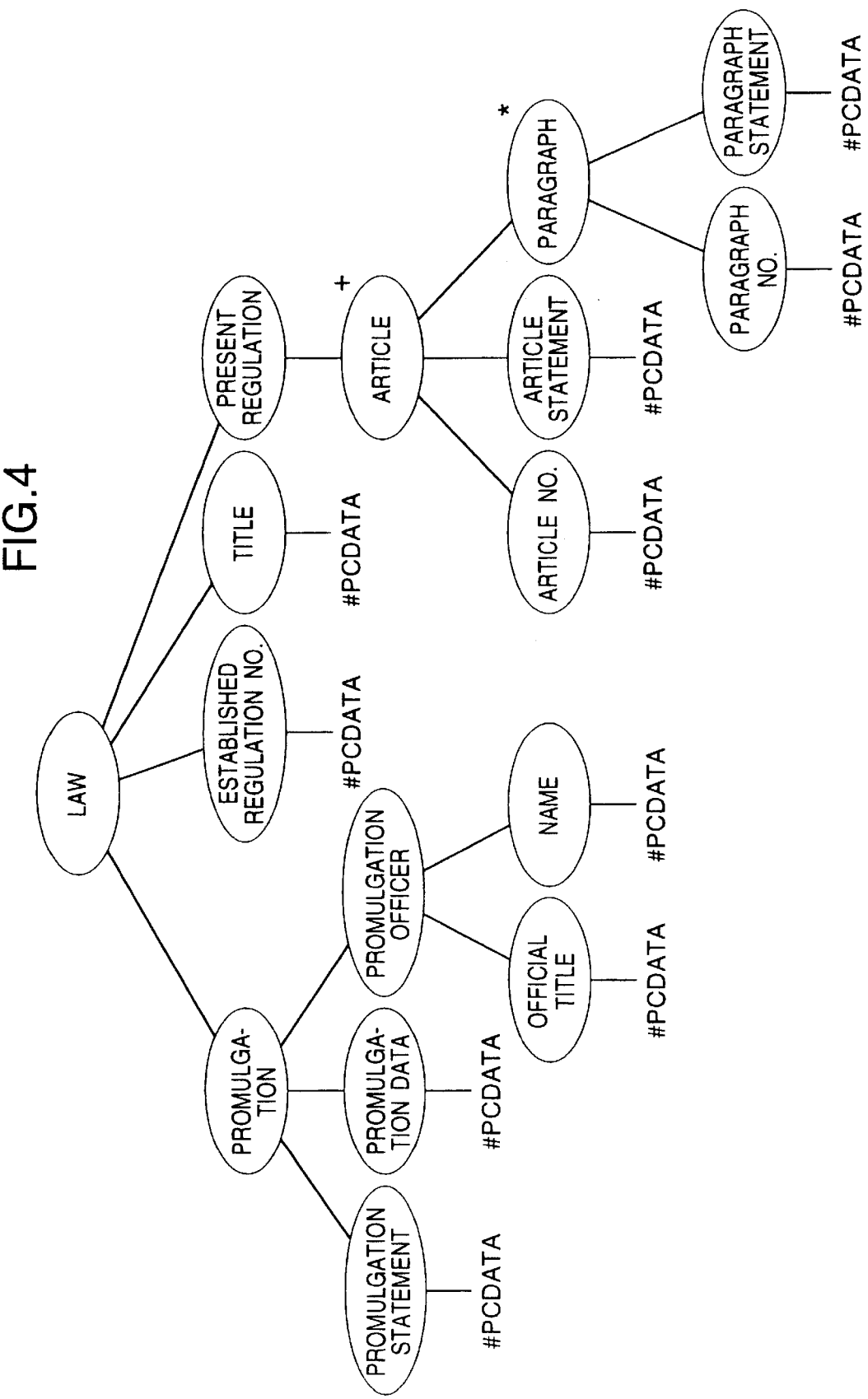
FIG. 4 is a tree diagram showing part of DTD shown in FIG. 3.

FIG. 2 shows an example of the non-structured document 101 shown in FIG. 1. This document is obtained from an already present paper document regarding a law through character recognition. Although there is no explicit description showing the document structure, this document has a layout of each component easy to read, using spaces or the like. In order for the document processing system to utilize such a text type electronic document, a document type definition (DTD) is set. FIG. 3 shows an example of DTD for the non-structured document shown in FIG. 2. The opening first line (line number 1, other lines are also represented by line numbers) indicates that the document structure definition has a name of "LAW". Second to seventeenth lines indicate definitions of elements. The name of an element is described after "!ELEMENT", and after this a model group is described between "(" and ")". The model group is an aggregation of constituents which form elements. These constituents are one or more elements and content tokens representative of data such as "#PCDATA", or model groups themselves disposed in a nest may be used as such constituents. The second line indicates that the element "LAW" is constituted by a series of elements of "PROMULGATION", "ESTABLISHEDREGULATIONNO" "TITLE", and "PRESENTREGULATION". The third line indicates that the element "PROMULGATION" is constituted by a series of elements of "PROMULGATIONSTATEMENT", "PROMULGATIONDATE", AND "PROMULGATIONOFFICER". The eleventh line indicates that the element "PRESENTREGULATION" is constituted by one or more "ARTICLES". The element affixed with "+" such as the "ARTICLE" means that more than one element may be used. The element affixed with an asterisk "*" means that the number of elements is optional. The element "#PCDATA" at the fourth, fifth, and seventh to tenth lines means that the corresponding elements "PROMULGATIONSTATEMENT", "PROMULGATIONDATE", "OFFICIALTITLE", "NAME", "ESTABLISHEDREGULATIONNO", AND "TITLE" each have the string indicating the contents of the element. The document structure in a tree diagram is shown in FIG. 4.

In this system, the document structure of a non-structured document such as shown in FIG. 2 is analyzed by directly using DTD such as shown in FIG. 3 to generate a structured document which matches DTD.

The keyword extraction module 102 shown in FIG. 1 refers to the keyword extraction rule 103 to extract a keyword from the non-structured document 101 and generate the keyword/text model 104. An example of the keyword extraction rule 103 is shown in FIG. 5. This rule is an aggregation of combinations of the name of an element to be extracted as the keyword and a layout condition which describes information about layout and string used for the extraction. In FIG. 5, the first item at each line is the name of a keyword, and the second and following items are the layout conditions. FIG. 6 gives an explanation of a description constituent of the layout condition shown in FIG. 5. For example, the first line shown in FIG. 5 means that the format conditions of the keyword "OPENINGTITLE" are that a character "○" is at the three-space position from the line head, an optional length of string follows, and the line ends at a string "LAW" or "REGULATION". The fourth line means that the format conditions of the keyword "PROMULGATIONDATE" are that a string "SHOWA" or "TAISHO" is at the optional-space position from the line head, followed by INTEGER→"YEAR"→INTEGER→"MONTH"→INTEGER→"DAY" in this order to end the line.

The keyword extraction module 102 shown in FIG. 1 checks whether there is a string in the electronic document which string matches the format conditions of the keyword extraction rule. If there is a matching string, it is extracted as the keyword (an example of an extracted keyword is shown in FIG. 7). Thereafter, the document is separated into keywords and other strings to generate the abstract keyword/text model 104 which is an aggregation of keywords and other strings. Specifically, if there is a string which is not a keyword, between keywords, it is considered to be a "text" string other than keywords, and a keyword/text model such as shown in FIG. 8 is configured. The keyword/text model shown in FIG. 8 starts from the keyword "OPENINGTITLE", followed by a keyword "PROMULGATIONDATE"→a keyword "ESTABLISHEDREGULATIONNO."→a keyword "PROMULGATIONSTATEMENT"→a keyword "TITLE", →a keyword "ARTICLENO.". Since a string which is not a keyword is sandwiched between the keyword "ARTICLE NO." and the next keyword "PARAGRAPH NO.", this string is considered as a text.

There is a case wherein the same string in the same region of the document is extracted as a plurality of keywords. For example, in the example of the extracted keywords shown in FIG. 7, the string "○△△PREFECTUREFLOODDEFENCESIGNALREGULATION" at the first and second lines are extracted as the keyword of the keyword names of "OPENINGTITLE" and "TITLE". In such a case, it is assumed that the keywords are extracted from the same region and a plurality of keyword/text models corresponding to each keyword are generated. The keyword/text model shown in FIG. 8 is formed by selecting the "OPENING TITLE" from the region conflicting keyword names "OPENINGTITLE" and "TITLE". Of the plurality of keyword/text models, the model which the parsing module 105 fails to parse, is determined as an improper keyword/text model. If there is a plurality of keyword/text models which succeeded the parsing, an optimum one is selected in accordance with a criterion such as the number of extracted keywords so that a single SGML document is eventually generated from the optimum keyword/text model.

Figure 9:
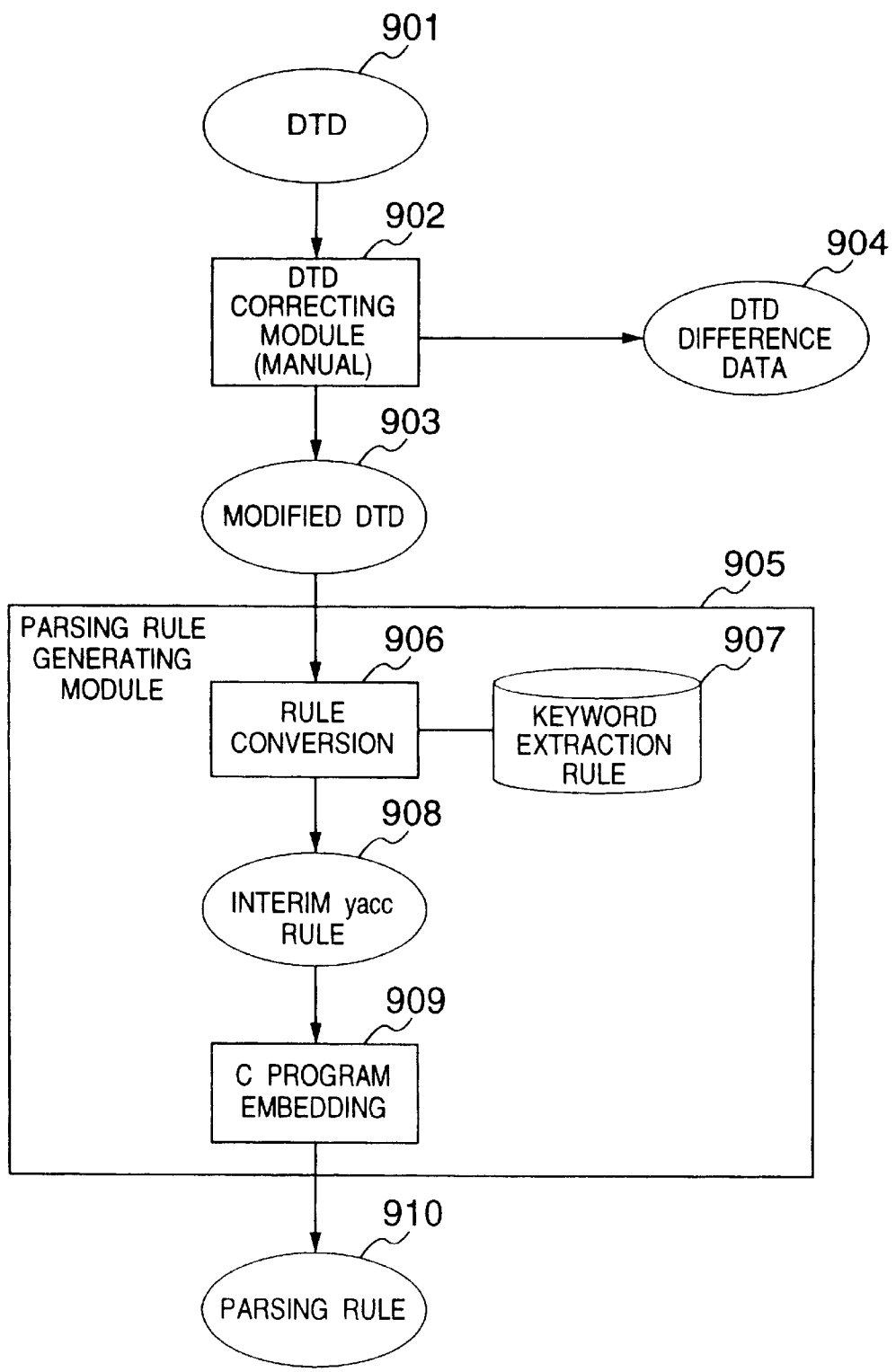
FIG. 9 is a block diagram illustrating the operation outline of a parsing rule generating module.

The parsing module 105 shown in FIG. 1 performs a parsing process for the keyword/text model 104 in accordance with the parsing rule 111. First, the processes of modifying DTD 106 by the DTD correcting module 107 and generating the parsing rule 111 will be described with reference to FIG. 9.

First, the DTD correcting module 107 manually generates a modified DTD 108 by modifying the description contents of DTD 106 set for the non-structured document so as to match the description format of the non-structured document, and stores the difference as the DTD difference data 109. The reason why such correction becomes necessary is that there may be a contradiction of the description items and order between the non-structured document 101 and DTD 106 used for this system. For example, although DTD 106 shown in FIG. 3 is prepared for the non-structured document 101 shown in FIG. 2, the element for the opening title "○△△ PREFECTURE FLOOD DEFENCE SIGNAL REGULATION" at the first line shown in FIG. 2 is not given in DTD 106 shown in FIG. 3. In DTD 106 shown in FIG. 3, elements are disposed in the order of "PROMULGATIONSTATEMENT→PROMULGATIONDATE→ESTABLISHEDREGULATIONNO.→TITLE", whereas in the non-structured document shown in FIG. 2, the elements are disposed in the order of "PROMULGATIONDATE→ESTABLISHEDREGULATIONNO.→PROMULGATIONSTATEMENT→TITLE".

Figure 10:
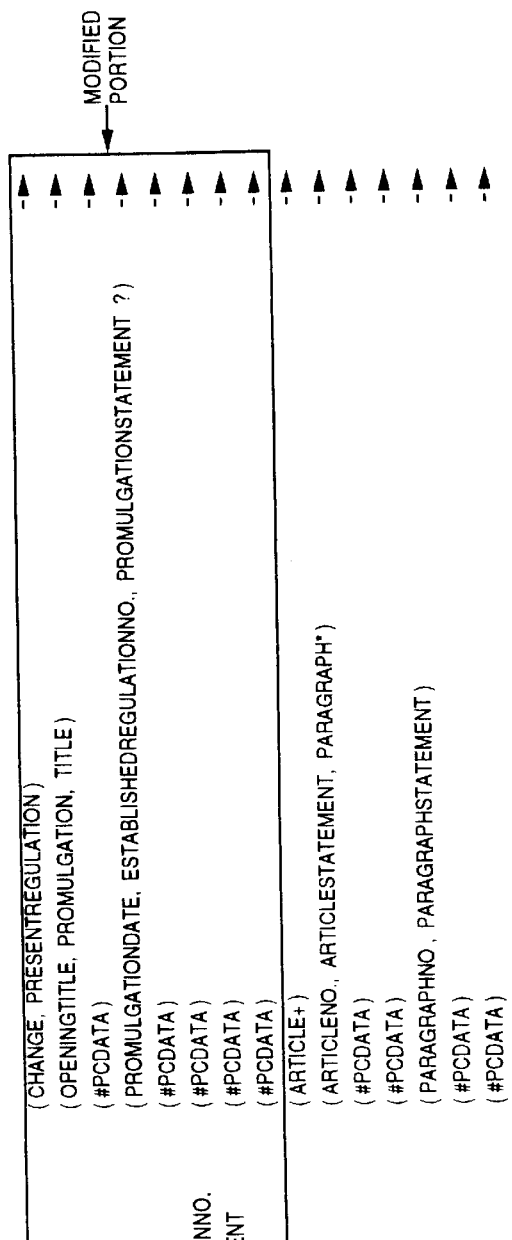
FIG. 10 shows an example of a modified DTD in part.

In order to eliminate such contradiction, the modified DTD 108 shown in FIG. 10 is manually generated. The meshed portion in FIG. 10 shows the modified elements. In order to explicitly indicate the modified portion, this portion is included by an element <CHANGE>. The modified portion of the original DTD 106 is stored as the DTD difference data 109 such as shown in FIG. 11. Also in this case, the modified portion is included by the element <CHANGE>.

If there is no contradiction of the document structure between the non-structured document and DTD 106, it is not necessary to generate the modified DTD 108 and DTD difference data 109.

Figure 12:
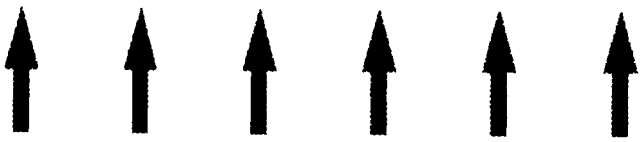
FIG. 12 shows conversion rules to be referred to when the parsing rule generating module converts DTD into a yacc rule.

After DTD 106 is modified where necessary, the parsing rule generating module 110 executes a rule conversion process 906 in accordance with the rule conversion regulation 112 shown in FIG. 12 to convert the element definition described in the modified DTD 108 into an interim yacc rule 908. Each rule for an interim (hereinafter called a "production rule,") is constituted by right and left sides partitioned by a colon ":" such as "A : B C;". If there is a pattern described at the right side is present, the rule is satisfied and the element at the left side is configured. In this example of the production rule of "A : B C;", an element A is generated if a pattern "B C" is present.

In DTD, the production rule having the right side of "#PCDATA" means that the left side element corresponds directly to the string of the document structure analysis result. In converting the production rule into the interim yacc rule, if the left side element is an element extracted as a keyword in accordance with the keyword extraction rule shown in FIG. 5, then #PCDATA is converted into [#KEY "(KEYWORDNAME)"]. #PCDATA in the other production rule is converted into "#TEXT" meaning a string other than the keyword. For example, the production rule converted into [OPENINGTITLE: #KEY "OPENINGTITLE"] indicates that the keyword "OPENINGTITLE" corresponds to the element "OPENINGTITLE". The production rule converted into [ARTICLESTATEMENT: #TEXT] indicates that a string other than the keyword corresponds to the element "ARTICLESTATEMENT".

FIG. 13 shows an example of the yacc rule converted from the modified DTD shown in FIG. 10. For example, the definition at the fifth line shown in FIG. 10 is converted into the product rules at the fourth and fifth lines shown in FIG. 13. In this case, the "PROMULGATIONSTATEMENT ?" shown in FIG. 10 is converted into "opt0" at the fourth line shown in FIG. 13 in accordance with the second bottom line rule shown in FIG. 12. The definition of "opt0" is described at the fifth line of FIG. 13.

If such an interim yacc rule is used, the parsing module generated by yacc outputs only a success/failure of parsing and does not output the correspondence between the keyword/text model and elements. However, in order to generate the structured document by using the results of parsing, it becomes necessary, when each element analysis succeeds, i.e., when each interim rule is satisfied, to add, to the keyword/text model, information (hereinafter called "tag information") indicating which element corresponds to each constituent of the keyword/text model. To this end, the parsing rule generating module 110 executes a C language program embedding process 909 for the interim yacc rule 908 in order to add the tag information to the keyword/text model and generate the parsing rule 111. An example of the parsing rule 910 is shown in FIG. 14. The meshed portions illustrate the process of the embedded C language programs. In this process, pieces of tag information corresponding to the right side elements of the production rule are coupled and the tag information corresponding to the left side elements of the production rule is generated.

Referring back to FIG. 1, yacc 113 receives the generated parsing rule 111 and generates a parsing module 105 which performs a parsing process in accordance with the parsing rule 111. Manual operation required during the process of generating the parsing module 105 from DTD 106 is only the operation of changing the document structure definition so as to match the description format of the non-structured document and generating the DTD difference data 109. The other operations are automatically performed.

The parsing module 105 analyzes the document structure for the keyword/text model 104 to verify whether the keyword/text model 104 matches the parsing rule 111, and adds the tag information representative of the document structure detected during this process to the keyword/text model 104. The interim SGML document 114 is generated from the keyword/text model added with the tag information.

Keywords and texts (hereinafter collectively called a "token") of the keyword/text model both correspond to "#PCDATA" in DTD of the tree diagram shown in FIG. 4, i.e., to the string representing the contents of each element. The keyword is a string in one-to-one correspondence with each element, whereas the text is a string having no correspondence with each element yet. The parsing process corresponds to generate the tree structure shown in FIG. 4 from the one-dimensional arrangement of keywords and texts, i.e., the keyword/text model.

The outline of this process by the parsing module 105 is illustrated in FIG. 19. The parsing module 105 generated by yacc 113 is constituted by a state transition table 2004 and a parser 2003 which performs the parsing process while referring to the state transition table 2004. Described in the state transition table 2004 are tokens acceptable in a certain state of parsing, and information on to which state of parsing is changed when a token is accepted. The parser 2003 sequentially reads a token starting from the opening token, the tokens being a constituent of the keyword/text model 2001 (2005). If it is judged in a certain state that the input token cannot be accepted, it is judged that parsing failed (2006→2007). Conversely, if acceptable, the state of parsing advances one step in accordance with the state transition table (2006→2008). In this state, if any one of the production rules of the parsing rule 111 can be satisfied, the tag information corresponding to the production rule is added to the keyword/text model 2001 (2009→2010: this process is realized by the inserted programs shown in FIG. 14). Specifically, if a single token corresponds to a certain element, start-tag information and end-tag information representative of the name of the element are added to the token as a pre-tag and a post-tag. For the elements corresponding to a plurality of tokens, the start-tag information and end-tag information are added to the start and end tokens. The details of adding tag information will be later detailed.

When the last token is input and if the parsing changes to the state of "normal termination", it is judged that the document structure analysis of the keyword/text model has succeeded.

The process when a production rule is satisfied during the parsing will be detailed with reference to the keyword/text model shown in FIG. 8 and the rule shown in FIG. 13. This process realizes the following two functions.

(1) To what element a keyword or text corresponds is determined. For example, if the keyword "ARTICLENO." at the sixth line of the keyword/text model shown in FIG. 8 is input, the production rule at the thirteenth line of FIG. 13 is satisfied (which production rule is satisfied in a certain state is described in the state transition table 2004), and the keyword "ARTICLENO." corresponds to the element "ARTICLENO.". In this case, the start-tag information and end-tag information of the "ARTICLENO." are added to the pre-tag and post-tag of the keyword "ARTICLENO." of the keyword/text model (seventeenth and eighteenth lines in FIG. 20). Next, when the text at the seventh line of FIG. 8 is input, the production rule at the fourteenth line of FIG. 13 is satisfied so that this text is considered to correspond to the element "ARTICLESTATEMENT". The start-tag information and end-tag information of the "ARTICLESTATEMENT" are added to the pre-tag and post-tag of the TEXT (twenty first and twenty second lines in FIG. 20).

(2) Adjacent elements are summarized to a more abstract element.

For example, in FIG. 4, the adjacent elements "PARAGRAPHNO." and "PARAGRAPHSTATEMENT" are summarized to a more abstract "PARAGRAPH". In the example of the keyword/text model shown in FIG. 8, the adjacent "PARAGRAPHNO." and the text (corresponding to "PARAGRAPHSTATEMENT") at the eighth and ninth lines are summarized to the one element "PARAGRAPH" in accordance with the production rule at the sixteenth line of FIG. 13. If this production rule is satisfied, the start-tag information of "PARAGRAPH" is added to the keyword "PARAGRAPHNO." at the eighth line of FIG. 8, and the end-tag information is added to the text at the ninth line (twenty fourth and twenty eighth lines in FIG. 20). The same operation is performed for the combinations of tenth and eleventh lines, twelfth and thirteenth lines, and fourteenth and fifteenth lines in FIG. 8.

The adjacent "ARTICLENO." (sixth line) and "ARTICLESTATEMENT" (seventh line) and a plurality of "PARAGRAPHS" (eighth to fifteenth lines) can be summarized to the element "ARTICLE" in accordance with the production rules at the twelfth and fifteenth lines in FIG. 13. In this case, the start-tag information of "ARTICLE" is added to the pre-tag of the keyword "ARTICLENO." at the sixth line, and the end-tag information is added to the post-tag of the text at the fifteenth line (in FIG. 20, only the addition of the start-tag information of "ARTICLE" is illustrated at the seventeenth line).

If the elements are summarized whose constituents are keywords representing a number such as "ARTICLE" and "PARAGRAPH" (in this case, "ARTICLENO." and "PARAGRAPHNO."), the first number and the continuity between numbers are checked. Namely, it is checked whether the number begins with "1" and thereafter the numbers 1, 2, 3, . . . are continuous.

The above process is sequentially performed for an input token of the keyword/text model 104. If the tree structure shown in FIG. 4 having one root (in the example shown in FIG. 4, "LAW") can be obtained, it is judged that the keyword/text model 104 matches the parsing rule 111 and the parsing has succeeded. Conversely, if a token input in a certain state during the parsing is not acceptable, i.e., if the keyword/text model 104 does not match the parsing rule 111, it is judged that the parsing has failed. If in the continuity check of numbers of the function (2) described above, the first number is abnormal or the continuity between numbers is not retained, it is judged that the document structure analysis has failed. For example, such cases corresponding to the number 3 instead of starting from the number 1 or the numbers are skipped as in 1, 2, and 5.

If the parsing has succeeded, the parsing module 105 outputs the interim SGML document 114 in accordance with the tag information given to the keyword/text model 104. Specifically, the output interim SGML document 114 has tags corresponding to the start-tag information and end-tag information and added to the front and back of a string corresponding to each token of the keyword/text model 104. An example of the interim SGML document 114 is shown in FIG. 15.

As seen from this example, the tag information includes the start-tag information and end-tag information, and the end-tag information is not always positioned near the start-tag information. For example, although the end-tag information </ARTICLENO.> for the start-tag information <ARTICLENO.> is just two lines below, the end-tag information </ARTICLE> for the start-tag information <ARTICLE> is far below the drawing space. Therefore, if the document structure is to be manually modified when the interim SGML document is generated, it is required to search the corresponding start-tag information and end-tag information over the whole of the document, requiring a large amount of labor. In this embodiment, necessary modification is completed at the stage of DTD so that the generated interim SGML document 114 matches the input non-structured document 101 and the modification described above is not necessary.

If a plurality of keywords are extracted from the same region, a plurality of keyword/text models are generated. In this case, the parsing process is performed for all the keyword/text models. If an erroneous keyword is contained, the parsing fails. If there are a plurality of keyword/text models which have succeeded in the parsing, an optimum keyword/text model is selected in accordance with, for example, the condition that there are a large number of extracted keywords, and a corresponding interim SGML document is output. This will be described by using an example shown in FIG. 7 in which two keywords "OPENINGTITLE" and "TITLE" are extracted from the same string of the non-structured document. The keyword/text model generated by selecting the "TITLE" fails in the parsing because the first line in the modified portion of the modified DTD stipulates that the "OPENINGTITLE" can appear at the top of the "LAW" but the "TITLE" cannot appear at the top of the "LAW". Therefore, the interim SGML document for the keyword/text model generated by selecting the "TITLE" is not output. On the other hand, the keyword/text model generated by selecting the "OPENINGTITLE" succeeds in the parsing, and the corresponding interim SGML document is output as shown in FIG. 15.

Figure 16:
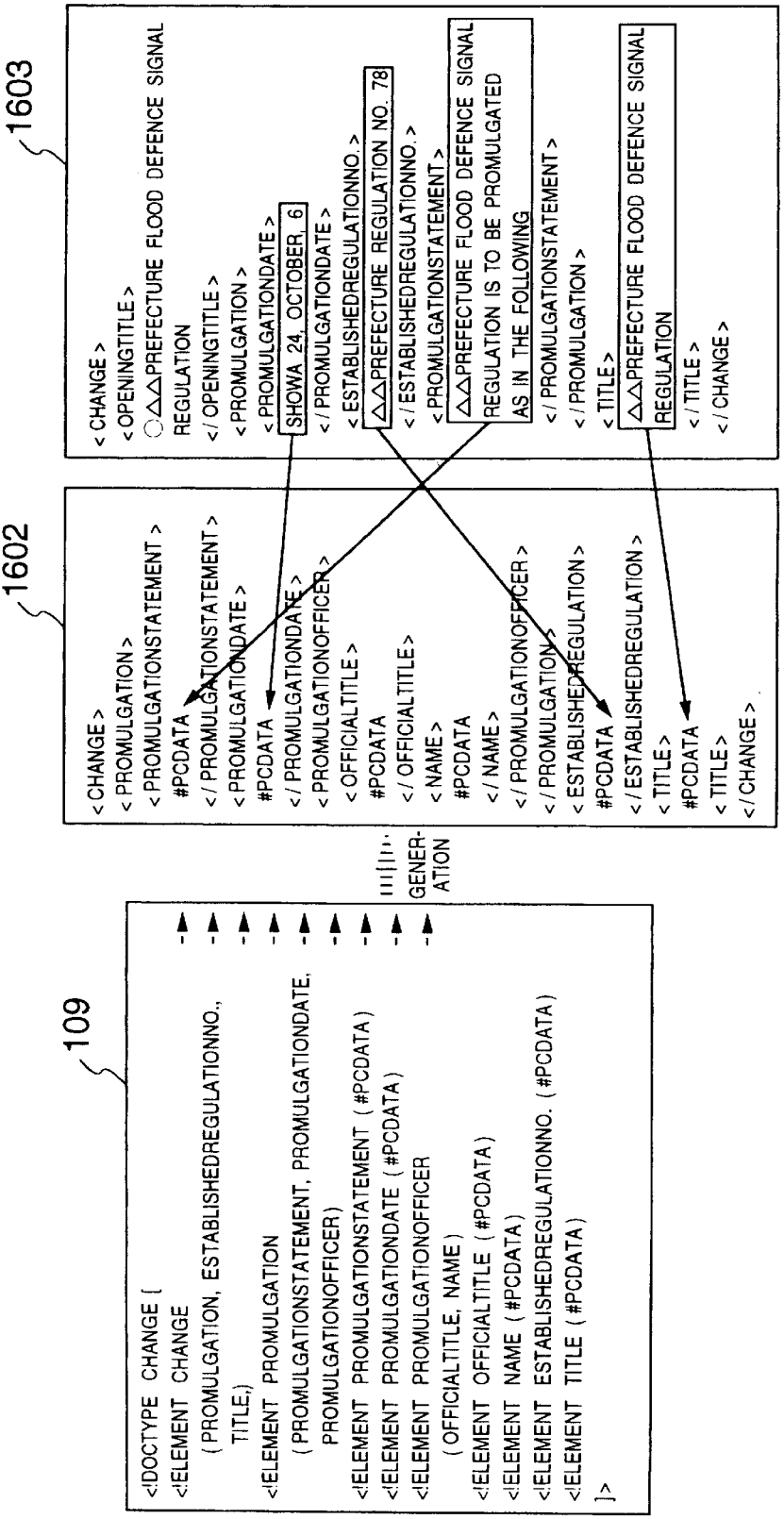
FIG. 16 illustrates an example of a process by an SGML document correcting module.

If there is the DTD difference data 109, the SGML document correcting module 115 modifies the interim SGML document 114 in accordance with the DTD difference data. The contents of a particular process will be described with reference to FIG. 16. The SGML document correcting module 115 generates an instance 1602 of modified part in DTD which is a partial SGML document corresponding to the contents described in the DTD difference data 109. In this case, a string "#PCDATA" representing the contents of the document structure is required to be replaced by a corresponding string. A change module 1603 for the interim SGML document replaces the string by another string representative of the contents of the element having the same name. For example, the "#PCDATA" sandwiched between the two tags <PROMULGATIONSTATEMENT> AND </PROMULGATIONSTATEMENT> in the instance 1602 of modified part in DTD is replaced by a string "ΔΔPREFECTUREFLOODDEFENCESIGNALREGULATIONISTOBEPROMULGATEDASINTHEFOLLOWING" sandwiched between the same tags, in the changes 1603 in the interim SGML document. Similarly, the "#PCDATA" sandwiched between the two tags <PROMULGATIONDATE> and </PROMULGATIONDATE> is replaced by a string "SHOWA 24, OCTOBER, 6", and the "#PCDATA" sandwiched between the two tags <ESTABLISHEDREGULATION NO.> and </ESTABLISHEDREGULATIONNO.> is replaced by a string "ΔΔPREFECTUREREGULATIONNO.78". As in the case of the "#PCDATA" sandwiched between the two tags <OFFICIALTITLE> and </OFFICIALTITLE> in the instance 1602 of modified part in DTD, whose element having the same name is not included in the changes 1603 in the interim SGML document, a string "NONE" is forcibly inserted.

The instance 1602 of modified part in DTD generated by the replacement process is replaced by the modified portion of the interim SGML document 114 of FIG. 1, i.e., in the example shown in FIG. 15, the portion sandwiched between the two tags <CHANGE> AND </CHANGE>. In this manner, the SGML document matching DTD 106 preset for subject documents can be generated. An example of the SGML document 116 is shown in FIG. 17. Since the individual document structure is directly reflected upon the SGML document, it is not necessary as in the conventional case to convert the document instance into the individual document structure.

Programs realizing the first embodiment may be stored in a storage device such as a hard disk, a floppy disk, and an optical disk.

According to the first embodiment described above, the parsing rule 111 used for the document structure analysis is directly generated from the document structure definition set for subject documents. It is therefore possible to reduce labor required for the generation of a rule. Since the document instance is generated through parsing in accordance with the document structure described in the document structure definition of each document, it is not necessary to convert the document instance obtained through parsing, from the format matching the common document structure into the format matching the individual document structure.

Next, the second embodiment will be described. This embodiment pertains to a method of supporting to generate the keyword extraction rule 103 by using the modified DTD and a given layout information.

Similar to the first embodiment, also in this second embodiment, an SGML format is adopted as an example of the structured document format, and as the document structure definition, a DTD is used which is a document type definition for SGML set for subject documents.

Figure 38:
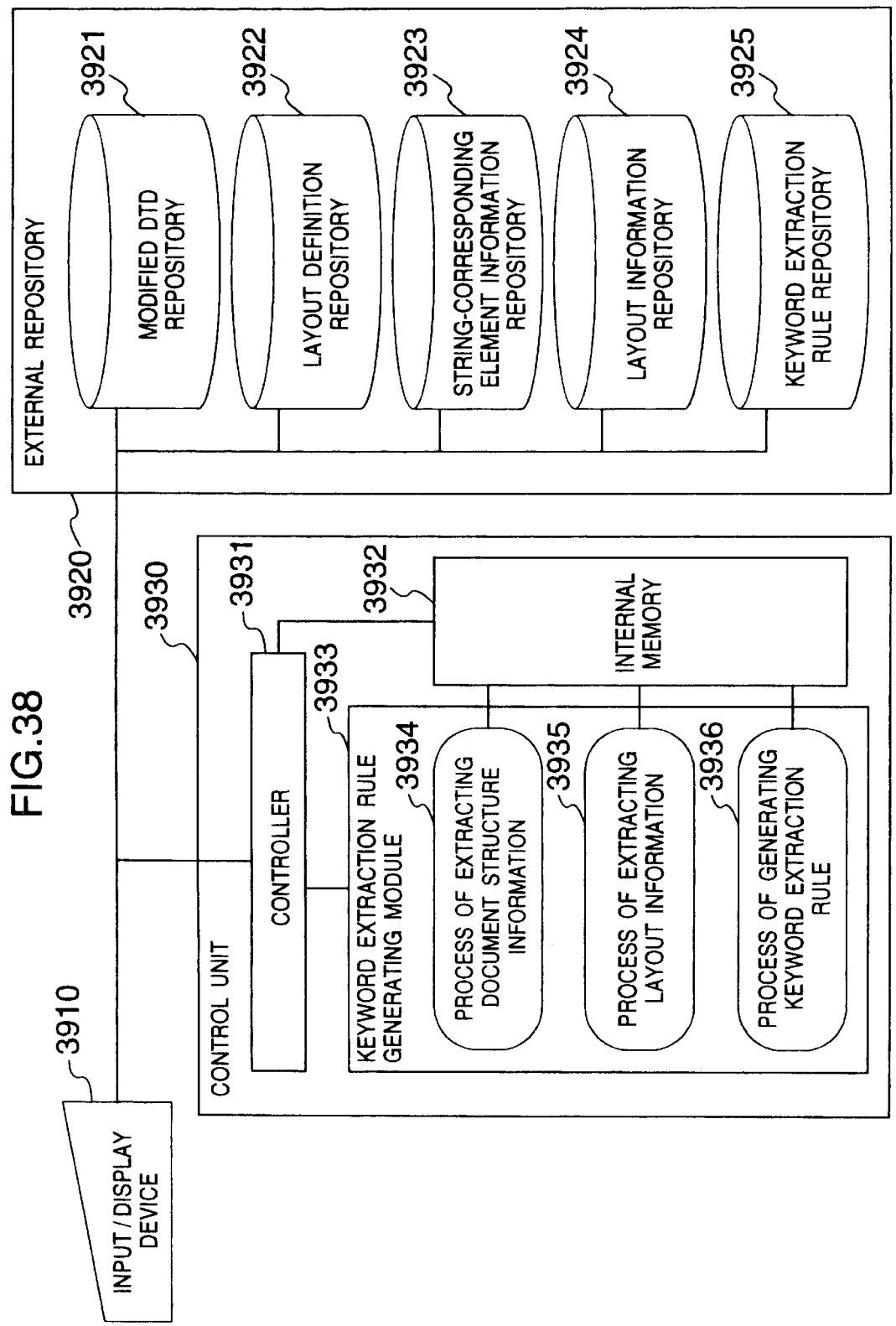
FIG. 38 is a block diagram showing the hardware structure of the keyword extraction rule generating system of the second embodiment.

FIG. 38 is a diagram showing the hardware structure of a keyword extraction rule generating system of the second embodiment. An input/display device 3910 receives an input entered by a user and displays an information about layout, a generated keyword extraction rule, or the like. The input/display device 3910 is constituted by a display, a keyboard, a mouse, or the like. An external repository unit 3920 stores a variety of data for keyword extraction rule generation. This unit 3920 is realized by a hard disk or the like and constituted by a modified DTD repository 3921, a layout definition repository 3922, a string-corresponding element information repository 3923, a layout information repository 3924, and a keyword extraction rule repository 3925. A control unit 3930 controls each device constituting the system, processes information for keyword extraction generation, and is constituted by a controller 3931, an internal memory 3932, and a keyword extraction rule generating module 3933. The controller 3931 reads data stored in the modified DTD repository 3391 and layout definition repository 3922, develops it on the internal memory 3932, executes processes of the keyword extraction rule generating module 3933 on the internal memory 3932 by using the developed data, and stores the generated string-corresponding element information and layout information respectively in the string-corresponding element information repository 3923 and layout information repository 3924. The processes to be executed include a process 3934 of extracting document structure information and a process 3935 of extracting layout information. A process 3936 of generating a keyword extraction rule notifies an operator via the input/display device 3910 of the string-corresponding element information stored in the string-corresponding element information repository 3923 and the layout information stored in the layout information repository 3924, and receives if necessary supplementary information from the operator via the input/display device 3910. The process 3934 of extracting document structure information, the process 3935 of extracting layout information, and the process 3936 of generating a keyword extraction rule can be described by known programming languages.

Next, the outline of processes of the second embodiment will be described.

Figure 21:
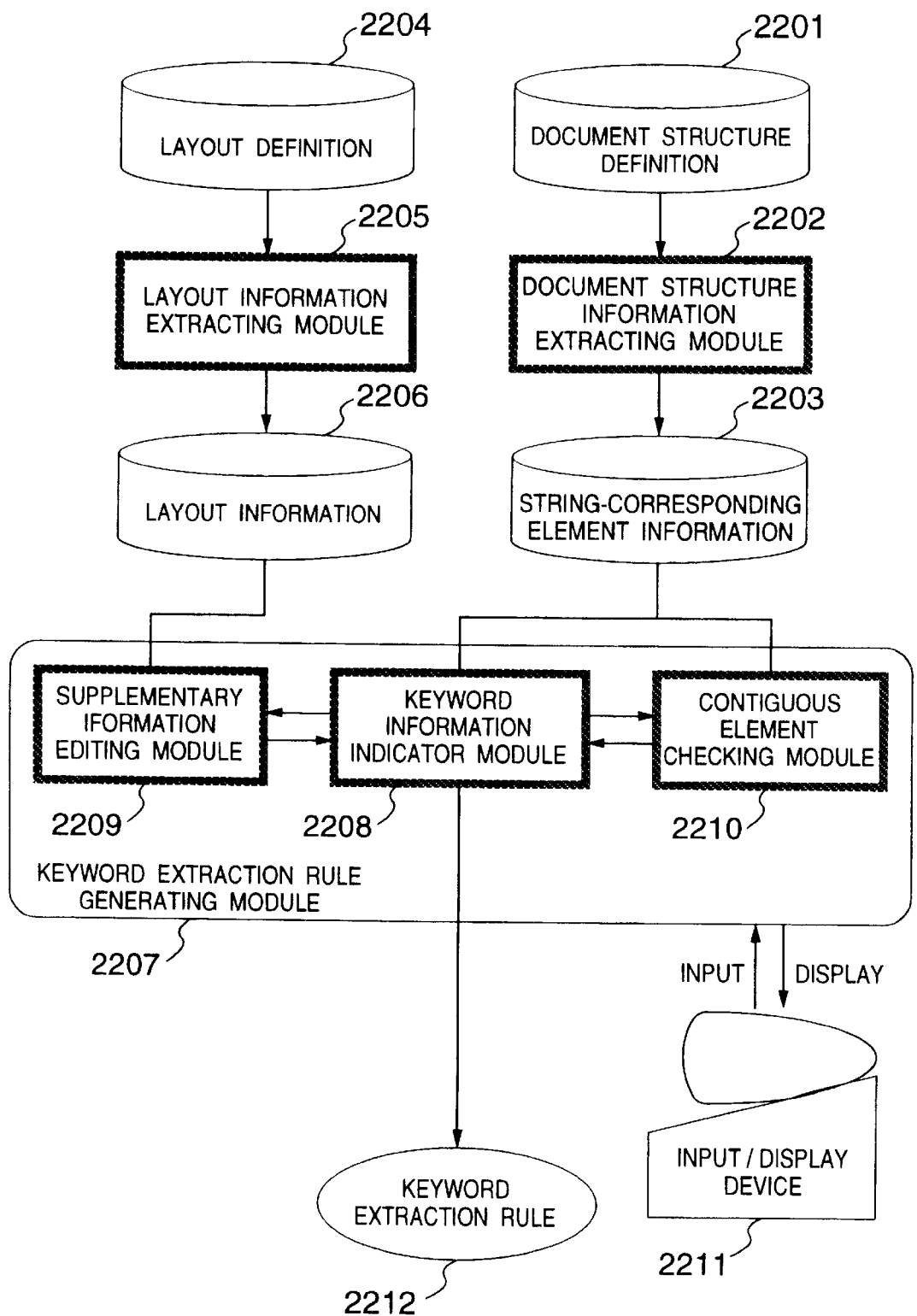
FIG. 21 is a block diagram illustrating the process outline to be executed by a keyword extraction rule generating system according to a second embodiment of the invention.

FIG. 21 is a block diagram showing a flow of the keyword extraction rule generating system. Reference numeral 2201 represents a modified DTD (same as DTD 108 shown in FIG. 1) obtained by modifying the document structure definition set for subject documents so as to match an input non-structured document. The modified DTD 2201 defines elements of the non-structured document and the relationship between elements. A document structure information extracting module 2202 refers to the modified DTD 2201 and generates string-corresponding element information 2203 describing elements in direct correspondence with a string (hereinafter called a "string-corresponding element") and a contiguity relationship between elements.

Reference numeral 2204 represents a layout definition set for subject documents which defines with what layout each element is output. A layout information extracting module 2205 refers to the layout definition 2204 and extracts items necessary for generating a keyword extraction rule as many as possible from the layout used for outputting each element and from the information of an output string. Each item itself is hereinafter called a "required item", and the information extracted for each item is called a "required item content". Layout information 2206 describes the required item content for each string-corresponding element.

A keyword extraction rule generating module 2207 informs via an input/display device 2211 an operator of the required item content for each string-corresponding element in the layout information 2206. This module 2207 receives information entered by the operator, modifies the required item content, and generates a keyword extraction rule 2212 in accordance with the modified required item content.

The process by the keyword extraction rule generating module 2207 will be described in more particular. A keyword information indicator module 2208 informs the operator of the name of a string-corresponding element described in the string-corresponding element information 2203. If a string-corresponding element is set as a keyword-corresponding element and given a format condition, this format condition is also displayed together with the string-corresponding element.

A supplementary information editing module 2209 sets the format condition of each string-corresponding element. The supplementary information editing module 2209 refers to the layout information 2206 and displays the required item content of the string-corresponding element selected by the operator. If the displayed required item content is different from the layout and strings of the non-structured document, the operator corrects it. The content of the required item is given by the operator if it cannot be extracted by the layout information extracting module 1105. In this manner, all the required item contents are edited so that they match the layout and strings of the non-structured document. After all the required items are edited, the supplementary information editing module 2209 generates the format condition used for keyword extraction by using the required item contents. By using the layout condition as a return argument, the process is passed to the keyword information indicator module 2208.

The keyword information indicator module 2208 sets as the keyword-corresponding element the string-corresponding element whose format condition was generated by the supplementary editing module 2209, and displays the layout condition together with the element name.

With the above processes, each keyword-corresponding element is determined. A contiguous element checking module 2210 inspects at a certain timing whether an aggregation of keyword-corresponding elements satisfies the restriction condition that non-keywords should not be contiguous. The contiguous element checking module 2210 refers to the contiguity relationship between string-corresponding elements described in the string-corresponding element information 2203, and inspects whether string-corresponding elements other than the keyword-corresponding elements (hereinafter called "non-keyword-corresponding elements") are contiguous. If there is a possibility that two non-keyword-corresponding elements are contiguous, the operator generates the layout condition of one of the two elements and sets it as the keyword-corresponding element. Conversely, if there is no possibility that non-keyword-corresponding elements are contiguous, keyword-corresponding elements are sufficient at this timing. At this time, an aggregation of combinations of the name of each keyword-corresponding element and its format condition is used as the keyword extraction rule 2212.

The outline process of the keyword extraction rule generating system has been described above. Next, the details of each process executed by the system shown in FIG. 21 will be described.

The document structure information extracting module 2202 refers to the modified DTD 2201 such as shown in FIG. 10, extracts each string-corresponding element and contiguity possibility information between string-corresponding elements, and outputs them as the string-corresponding element information 2203.

The string-corresponding element is an element having "#PCDATA" representative of a string of the document type definition (modified DTD) as a constituent of the model group. FIG. 22 shows the string-corresponding elements of the modified DTD shown in FIG. 10. In the example shown in FIG. 22, extracted as the string-corresponding elements are the elements "OPENINGTITLE", "PROMULGATIONDATE", "ESTABLISHEDREGULATIONNO.", "PROMULGATIONSTATEMENT", "TITLE", "ARTICLENO.", "ARTICLESTATEMENT", "PARAGRAPHNO.", and "PARAGRAPHSTATEMENT".

The document structure information extracting module 2202 checks a possibility of contiguous string-corresponding elements. The following two specific processes are performed.

(1) An aggregation of string-corresponding elements at the start and end of each element is obtained. For example, in the structured document shown in FIG. 15, at the start of the element "PROMULGATION" (1501 to 1506), the string-corresponding element "PROMULGATION-DATE" (1502 to 1503) appears, and at the end of the element "PROMULGATION", the string-corresponding element "PROMULGATIONSTATEMENT" (1504 to 1505) appears. In this process, the elements capable of appearing at the start and end of each element are derived from the modified DTD 2201 such as shown in FIG. 10.

(2) A combination of contiguous elements in the model group of the modified DTD is obtained. There is a contiguity possibility of each combination between the string-corresponding elements capable of appearing at the end of the preceding element and at the start of the succeeding element.

In this embodiment, in order to facilitate the execution of these two processes, the modified DTD such as shown in FIG. 10 is converted to have notation of BNF (Buckus Naur Form). This conversion procedure conforms with the rule conversion regulation 112 (FIG. 12) and is generally the same as the procedure of converting the modified DTD 108 into the interim yacc rule 908. However, in this embodiment, which element is determined as a keyword is not known. Therefore, the description "#PCDATA" of the modified DTD is not converted into the description of [#KEY "ARTICLENO."] or [#TEXT]. Only in this point, this embodiment differs from the rule conversion process 906.

FIG. 23 shows an example of the modified DTD expressed by BNF notation. Also in this embodiment, a rule described in BNF notation and obtained by converting the definition of each element of the modified DTD is called a "production rule". The right side of each production rule, in this embodiment, is called a "content model" of the left side element.

Figure 24:
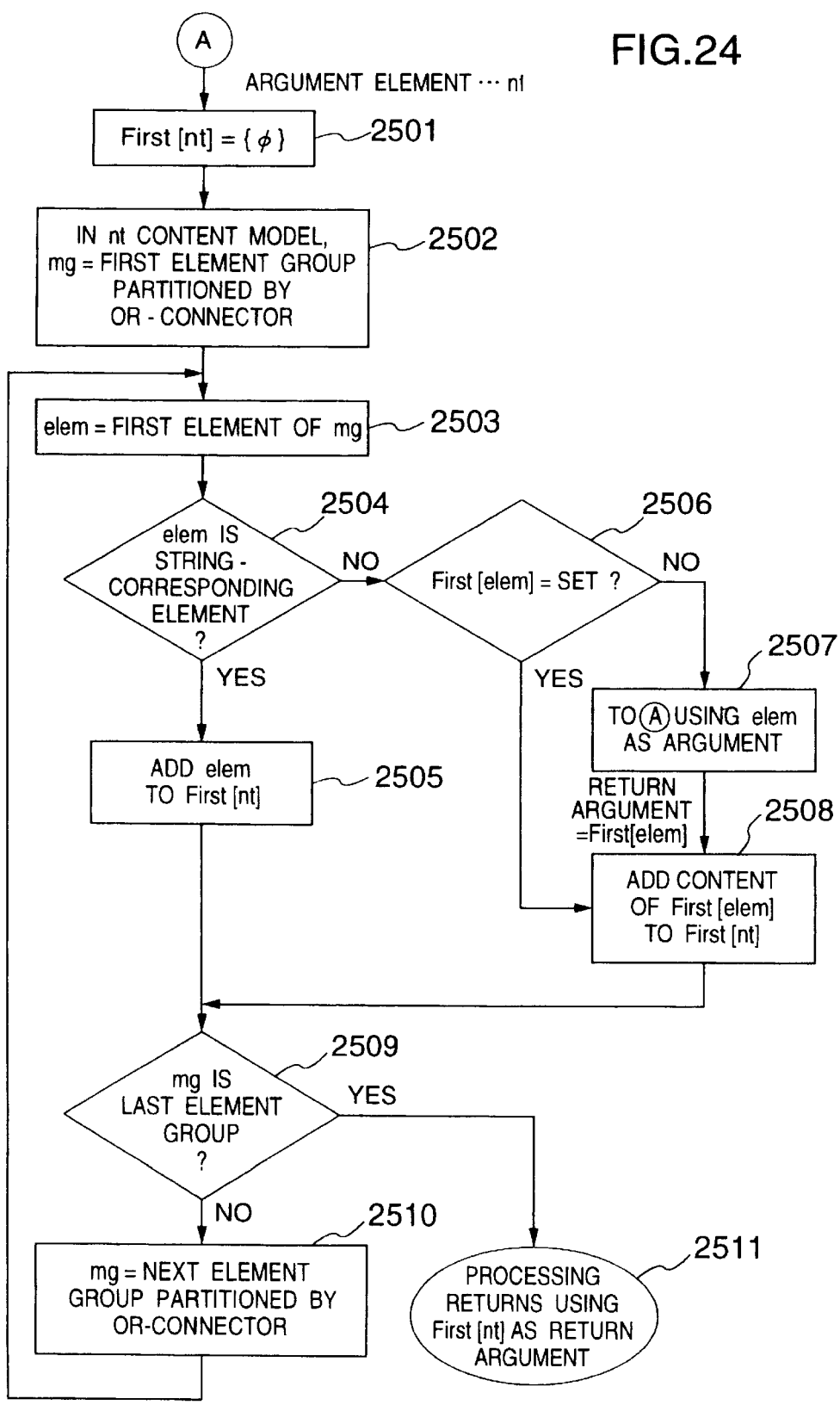
FIG. 24 is a diagram illustrating the procedure of obtaining string-corresponding elements capable of appearing at the start of each element.

The procedure of obtaining from the modified DTD expressed by BNF notation an aggregation of string-corresponding elements at the start and end of each element, will be described. The algorithm of this procedure is shown in FIG. 24. The procedure starting from A in FIG. 24 uses as an input argument an element, and as a return argument an aggregation of string-corresponding elements capable of appearing at the start of the element, and contains a recursive call. The variables mg and elem used in this procedure are local variables newly generated each time the procedure advances to A. First[xx] is a global variable representative of an aggregation of string-corresponding elements capable of appearing at the start of the element xx.

In order to obtain an aggregation of string-corresponding elements capable of appearing at the start of each element, the procedure A is executed by using the element as the argument (nt in FIG. 24).

In the procedure A, First[nt] is set to an empty aggregation (2501), First[nt] representing an aggregation of string-corresponding elements capable of appearing at the start of nt. In the nt content model, of the element groups partitioned by an OR-connector "|", the first element group is substituted into the variable mg (2502). If the OR-connector does not exist, the whole of the content model is substituted into the variable mg. The first element of mg is substituted into the variable elem (2503). Next, it is checked whether elem is a string-corresponding element (2504). If elem is a string-corresponding element, elem is added to First[nt] (2505) and the flow advances to step 2509, whereas if not, the content of First[elem] is added to First[nt] (2508) if First[elem] has been set (2506) and the flow advances to step 2509. If First[elem] is not set at step 2506, elem is used as the argument and the procedure A is recursively executed (2507). The return argument, i.e., the content of First[elem] is added to First[nt] and the flow advances to step 2509.

At step 2509, it is checked from the content model of nt whether mg is the last element group partitioned by the OR-connector. If not, the next element group is substituted into the variable mg (2510) and the flow returns to step 2503. If mg is the last element group, by using First[nt] as the return argument, the processing is passed to the procedure which called this procedure A (2511).

The procedure shown in FIG. 24 is performed until First[nt] is set for all elements. In this manner, an aggregation of string-corresponding elements capable of appearing at the start of each element can be obtained. In order to obtain an aggregation Last[ ] of string-corresponding elements capable of appearing at the end of each element can be obtained in the similar manner as the procedure shown in FIG. 24 by replacing the factors shown in FIG. 24 by the following two factors.

(a) First[xxx] in FIG. 24 is replaced by Last[xxx].
(b) The first element at step 2503 is replaced by the last element.

FIG. 25 shows First[ ] and Last[ ] of the aggregations of string-corresponding elements capable of appearing at the start and end of each element of the modified DTD shown in FIG. 10.

With the above procedures, it becomes possible to obtain the aggregation First[ ] of string-corresponding elements capable of appearing at the start of each element and the aggregation Last[ ] of string-corresponding elements capable of appearing at the end of each element.

Figure 26:
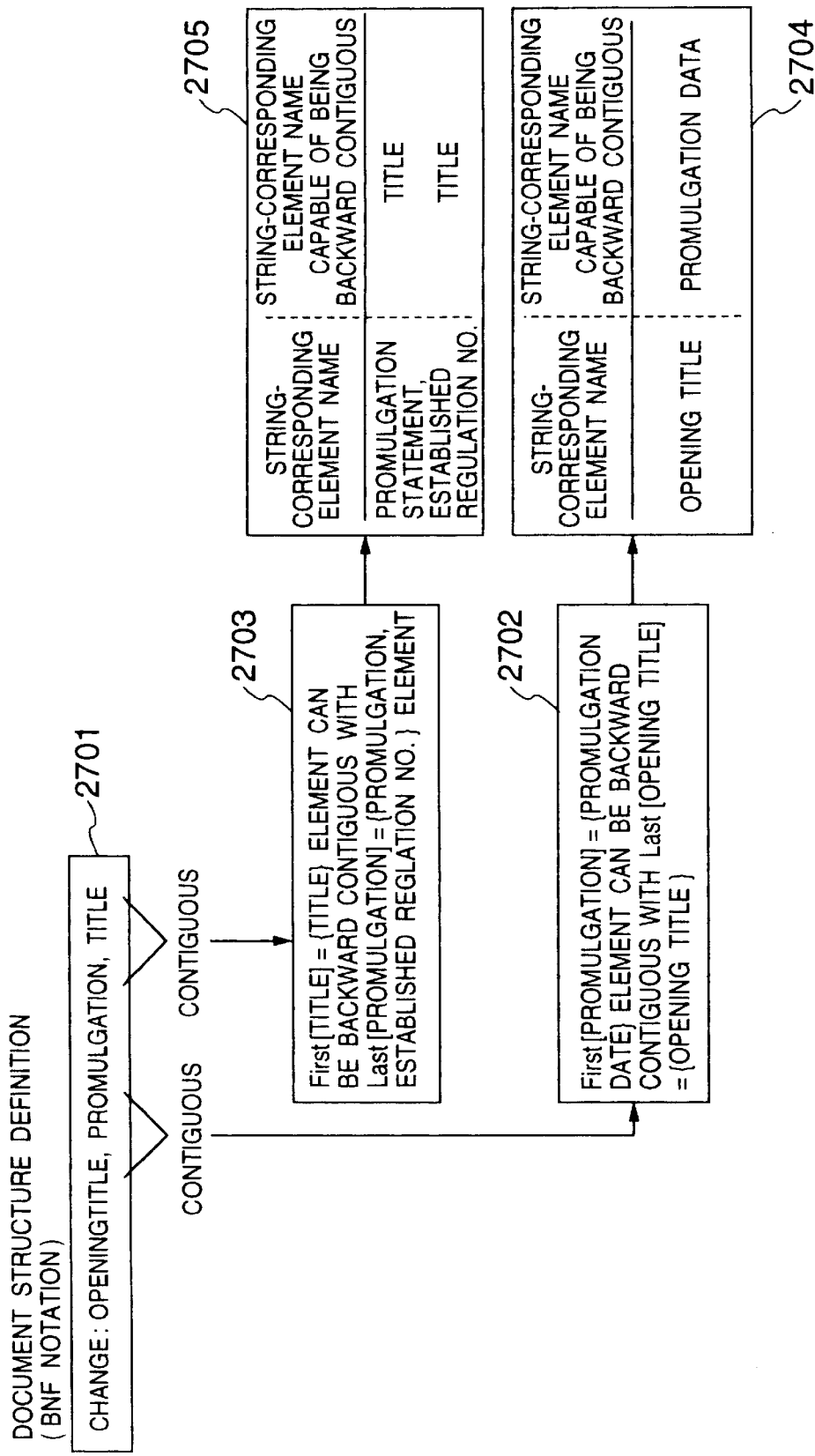
FIG. 26 is a diagram showing the contiguity relationship between string-corresponding elements in the modified DTD described in BNF notation shown in FIG. 23.

Next obtained is a combination of contiguous elements in the content model of the document structure definition. There is a contiguity possibility of each combination between component of Last[ ] of a preceding element and a component of First[ ] of a succeeding element. An example of this process is illustrated in FIG. 26 in which the production rule "CHANGE:OPENINGTITLEPROMULGATIONTITLE" 2402 shown in FIG. 23 is processed. In this production rule of the content model of the element "LAW", the elements "OPENINGTITLE" and "PROMULGATION" are contiguous and the elements "PROMULGATION" and "TITLE" are contiguous (2701). Therefore, the element in First[PROMULGATION] can be backward contiguous with the element in Last[OPENINGTITLE] (2702). Namely, the string-corresponding element "PROMULGATIONDATE" can be backward contiguous with the string-corresponding element "OPENINGTITLE" (2704). The element in First[TITLE] can be backward contiguous with the element in Last[PROMULGATION] (2703). Namely, the string-corresponding element "TITLE" can be backward contiguous with both the string-corresponding elements "PROMULGATIONSTATEMENT" and "ESTABLISHED-REGULATIONNO." (2705). This process is applied to all production rules in the document structure definition expressed in BNF notation. Therefore, an aggregation of all string-corresponding elements capable of being backward contiguous can be obtained, and this aggregation is the string-corresponding element information (2203 in FIG. 21). An example of the string-corresponding element information 2203 is shown in FIG. 27.

With the procedure described with the drawings up to FIG. 26, the document structure information extracting module 2202 can generate the string-corresponding element information 2203.

Next, the process of the layout information extracting module 2205 shown in FIG. 21 for extracting the layout information 2206 from the layout definition 2204 will be described.

The layout definition 2204 is set for subject documents and defines with what layout each element is output. FIG. 18 shows an example of the layout definition in part prepared for structured documents conforming with the document type definition (DTD). Reference numeral 2901 indicates that reference numerals 2901 to 2911 represent the layout definitions of the element "TITLE". A [font name] 2902 indicates that the font name used for outputting "TITLE" is Gothic, and a [font size] 2903 indicates that the font size is 12 pt (point) which is a length unit and 1 pt=1/72 inch. A [character pitch] indicates that the character pitch of "TITLE" is 14 pt. An [offset 1] 2905 and an [offset 2] 2906 indicate what minimum spaces from the right and left sides of a region where a document is output are reserved for outputting the content of "TITLE". A [first-line displacement] 2907 indicates a difference from the [offset 1] of an offset of the first line which often takes a different offset from other lines. A [connection with previous element] 2908 indicates which string is output after an element just before. In this example, after an element just before is output, the "TITLE" is output on a new line after line feed. A [string information] 2909 describes which string is output. In this example, a string CONTENT corresponding to the "TITLE", i.e., the string between the tag <TITLE> and tag </TITLE>, is output. A [placement] 2910 indicates how strings are placed between the area defined by the [offset 1] and [offset 2]. This [placement] 2910 takes four values "start", "end", "center", and "justify" corresponding to the left alignment, right alignment, centering, and equal space. In this example, the string of "TITLE" is output through centering.

Such layout definitions are essentially used for outputting a structured document and are not used for expressing the layout of a non-structured document. However, for a document having a regular layout such as legal documents, the layout definition is often determined in accordance with the layout regularity. Most of pieces of information of layout and string in the layout definition of such a document can be used for extracting keywords from the non-structured document.

The layout information extracting module 2205 refers to the layout definition 2204 and extracts items necessary for extracting a keyword as many as possible from the information of layout and string used for outputting each element. As described earlier, this item itself is called a "required item", and the information extracted for each item is called a "required item content".

FIG. 29 shows an example of required items for each keyword when the keyword rule shown in FIG. 5 is generated. An [element name] 3001 is the name of a subject string-corresponding element and takes a value of a string. A [left-hand space] 3002 and a [right-hand space] 3003 indicate the conditions of what minimum character spaces from the right and left sides of a region where a document is output are reserved for outputting the string of the element. A [first-line indent] 3004 indicates what character spaces at the left side are reserved at the first line which often takes a different offset from other lines. A [string condition] 3005 indicates what string describes the keyword. An [arrangement] 3006 indicates how keywords are arranged in the region defined by the [left-hand space] 3002 and [right-hand space] 3003. This [arrangement] 3006 takes four values "right justify", "left justify", "centering" and "equal space". A [previous string] 3007 and a [next string] 3008 indicate strings which show what strings are sandwiched between string-corresponding elements appearing before and after the subject keyword.

The layout information extracting module 2205 refers to the layout definition 2204 and extracts information of the required items shown in FIG. 29, i.e., the required item contents, as much as possible. FIG. 30 illustrates an example of a process of extracting the required item contents from the layout definition shown in FIG. 28.

In order to extract the required item content of a string-corresponding element, the definition of the string-corresponding element in the layout definition is used. For example, the required item for the "ARTICLENO." is extracted from the definitions 2912 to 2922 of the "ARTICLENO." shown in FIG. 28.

The required items [left-hand space] and [right-hand space] are the items indicating the same contents of the [offset 1] and [offset 2] of the layout definition. Therefore, only the unit of length is changed from pt to the number of characters. Specifically, the values of the [offset 1] and [offset 2] are divided by the value of the [character pitch] (3101 and 3102). The required item [first-line indent] has the content of the sum of the [offset 1] in the layout definition and [first-line displacement] divided by the 1674 [^character pitch] (3103). The content of the required item [string condition] is generated by referring to the [string information] in the layout definition (3104). However, in the example shown in FIG. 28, the [string information] is "CONTENT" for all elements so that the string in the document instance itself is output and specific information of a string cannot be obtained from the layout definition. Since the required item [arrangement] is the item representing the same concept as the [placement] in the layout definition so that the values are converted in accordance with the rules 3105. Into the content of the required item [previous string], the content of the [connection with previous element] is substituted (3106).

The content of the required item [next string] is obtained by using the string-corresponding element information and the [connection with previous element] of other elements in the layout definition (3107). Specifically, first a string-corresponding element (hereinafter called a "next element") backward contiguous with the subject string-corresponding element is obtained by using the string-corresponding element information. Next, the [connection with previous element] is checked for all next elements, and if the contents of all next elements are the same, this content is set as the content of the [next string] of the [next string]. If there is a next string having the different content of the [connection with previous element], the content of the [next string] is not set. For example, from the string-corresponding element information shown in FIG. 27 at 2806, it can be known that the next string of "ARTICLENO." is only "ARTICLESTATEMENT". The content of the [next string] of "ARTICLENO." is " " of the [connection with previous element of "ARTICLESTATEMENT"].

The above processes are executed for all string-corresponding elements to generate the layout information 2206 shown in FIG. 21.

The keyword extraction rule generating module 2207 shown in FIG. 21 informs via the input/output device 2211 an operator of the string-corresponding element information 2203 and layout information 2206. This module 2207 receives supplementary information from the operator to add and modify the required item content and generate the keyword extraction rule 2212. A specific process of the keyword extraction rule generating module 2207 will be described.

The keyword information indicator module 2208 informs the operator of the string-corresponding element name and which string-corresponding element is set as the keyword-corresponding element at a certain timing. If the operator instructs to set a particular string-corresponding element to the keyword-corresponding element, the keyword information indicator module 2208 activates the supplementary information input module 2209 which supplements the required item content of the string-corresponding element. If the operator instructs to inspect whether set keyword-corresponding elements satisfy at that timing the restriction condition that non-keywords should not be contiguous, the contiguous element checking module 2210 is activated.

Figure 31:
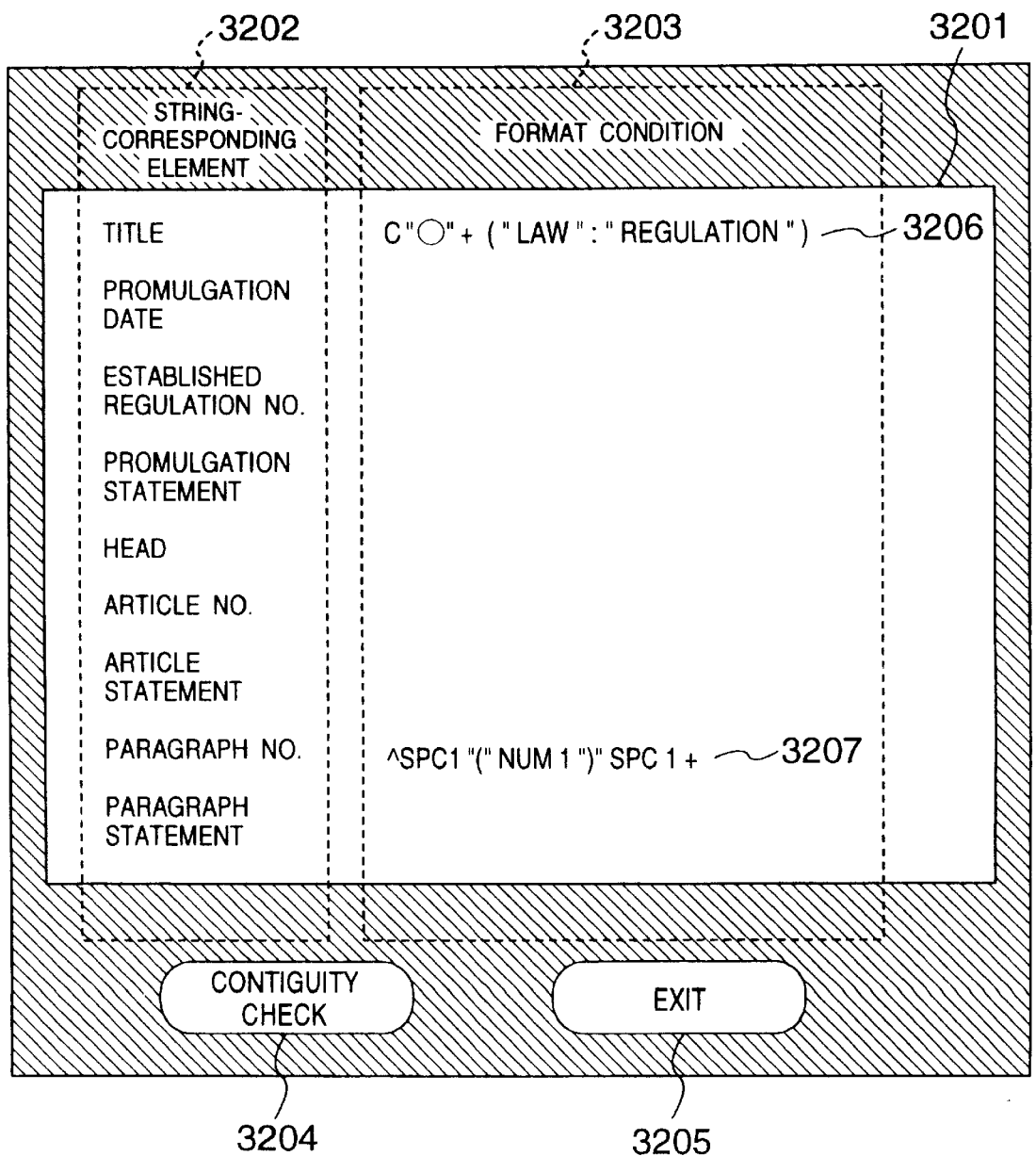
FIG. 31 is a diagram showing an example of an interface of a keyword information indicating module.
Figure 32:
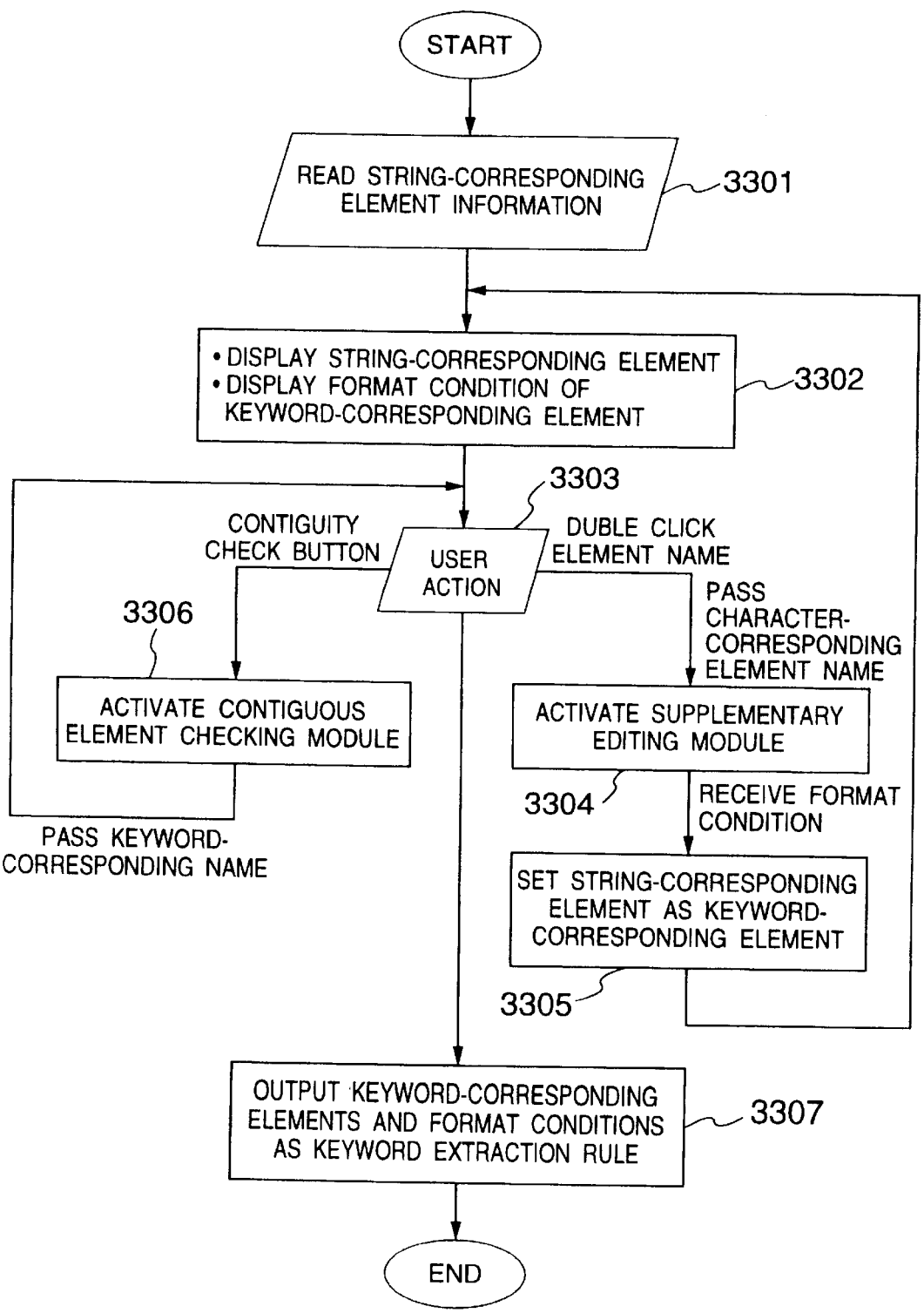
FIG. 32 is a flow chart illustrating the processes to be executed by the keyword information indicating module.

FIG. 31 shows an example of an interface for the keyword information indicator module 2208 to display information on the input/display device 2211 for the operator, and FIG. 32 is its process flow. The operation of the keyword information indicator module 2208 will be described with reference to FIGS. 31 and 32. Upon activation, the keyword information indicator module 2208 reads the string-corresponding element information 2203 and obtains the name of each string-corresponding element (3301). Reference numeral 3202 represents a keyword information window which is constituted by an element name display area 3202 for displaying the names of all string-corresponding elements and a format condition display area 3203 for displaying the format condition of for the string-corresponding element set as the keyword-corresponding element. At step 3202, the string-corresponding element name and the layout condition of an element set as the keyword-corresponding element at this timing are displayed. In this case, at the initial stage, the format condition is not set to any element so that the format condition display area 3202 displays no information. In order to give the format condition to a string-corresponding element and set this element as the keyword-corresponding element, the operator first double clicks the element name in the element name display area 3202 with a mouse to thereby activate the supplementary information editing module (2209 in FIG. 21) (3304). The detailed operation of the supplementary information editing module 2209 will be given later. The string-corresponding element name is passed to the supplementary information editing module 2209, and its format condition is received as the return argument. The string-corresponding element designated by the operator is set as the keyword-corresponding element (3305) and its format condition is displayed in the format condition display area 3203 (3302). In the example shown in FIG. 31, a display at the interface at a certain timing is shown. At this timing, the format conditions are given to the two string-corresponding element of the "TITLE" 3206 and "PARAGRAPHNO." 3207, which means that the two string-corresponding elements are set as the keyword-corresponding elements.

Reference numeral 3204 represents a button for checking contiguous elements. As this button 3204 is clicked, the contiguous element checking module (2210 in FIG. 21) is activated which inspects whether an aggregation of keyword-corresponding elements set at this timing satisfy the restriction condition that non-keywords should not be contiguous (3306). The operation of the contiguous element checking module 2210 will be later described. If the inspection judges that the keyword-corresponding elements satisfying the restriction condition are set, the operator clicks an exit button to instruct to terminate the process of the keyword information indicating module 2208. The keyword information indicator module 2208 outputs the keyword-corresponding element name and its format condition as the keyword extraction rule (2212 in FIG. 21) and terminates the process (3307). The contents of the processes by the keyword information indicator module 2208 have been described above.

Figure 34:
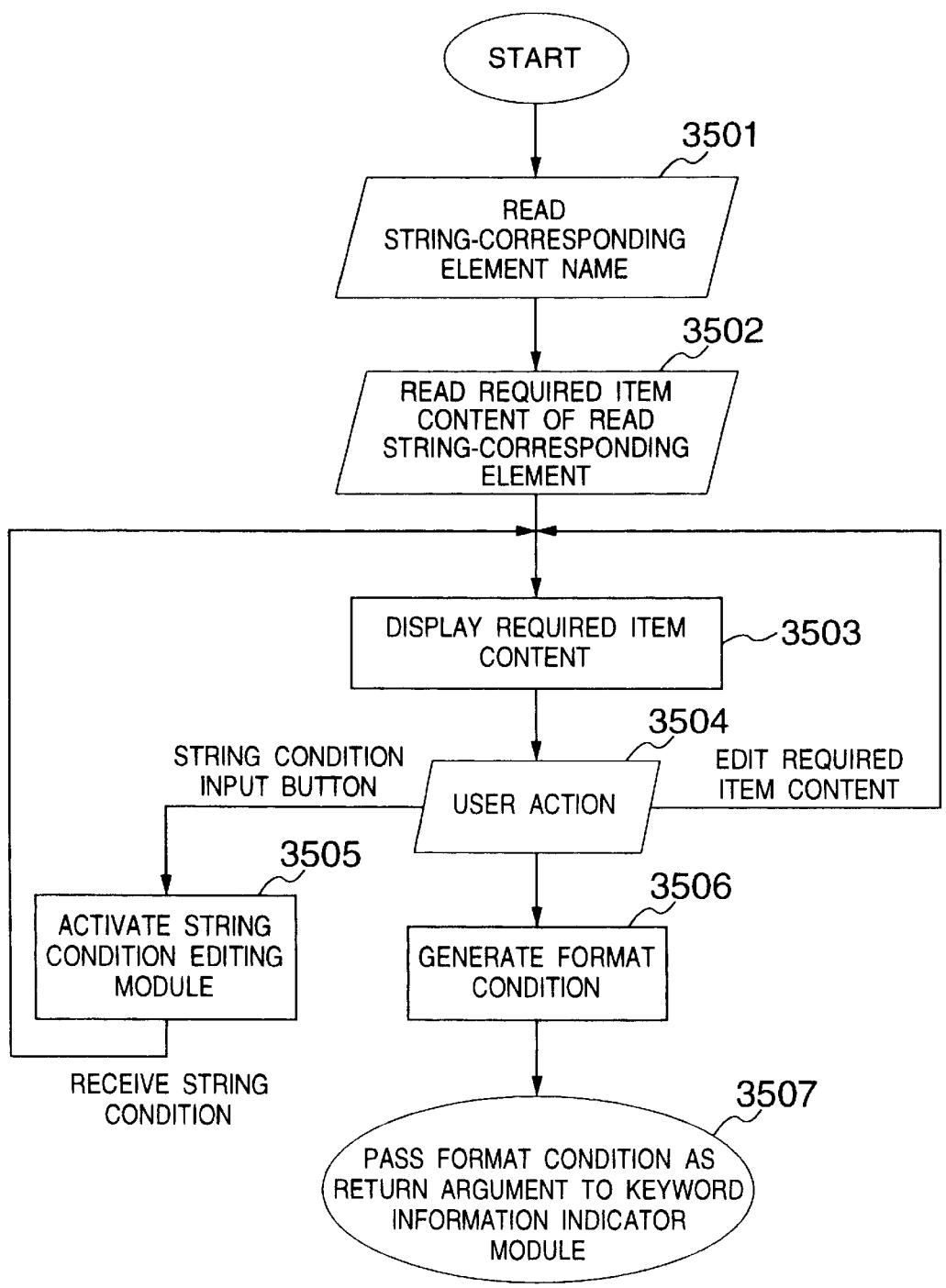
FIG. 34 is a flow chart illustrating the processes to be executed by the supplementary information editing module.

FIG. 33 shows an example of an interface of the supplementary information editing module 2209 activated when the element name is double clicked during the operation of the keyword information indicator module 2208, and FIG. 34 shows the process flow. The supplementary information editing module 2209 reads the name of the string-corresponding element set as the keyword-corresponding element whose layout condition is to be set, the name being passed from the keyword information indicator module 2208 (3501), and reads the required item content of the element from the layout information (2206 in FIG. 21 (3502). The required item content is displayed on a required item editor 3401 (3503). The required item editor 3401 consists of windows in which the display content can be edited. If the display content is different from the description format of the non-structured document, the operator changes its content. Since the required item content (e.g., [string condition] in the extraction example shown in FIGS. 30 and 31) which cannot be extracted by the layout information extracting module 2205 is not displayed on the required item editor, the operator enters the required item content to the required item editor (3504 to 3503). An example after the [string condition] is entered is shown in FIG. 30 under the title of "after entering string condition".

Figure 35:
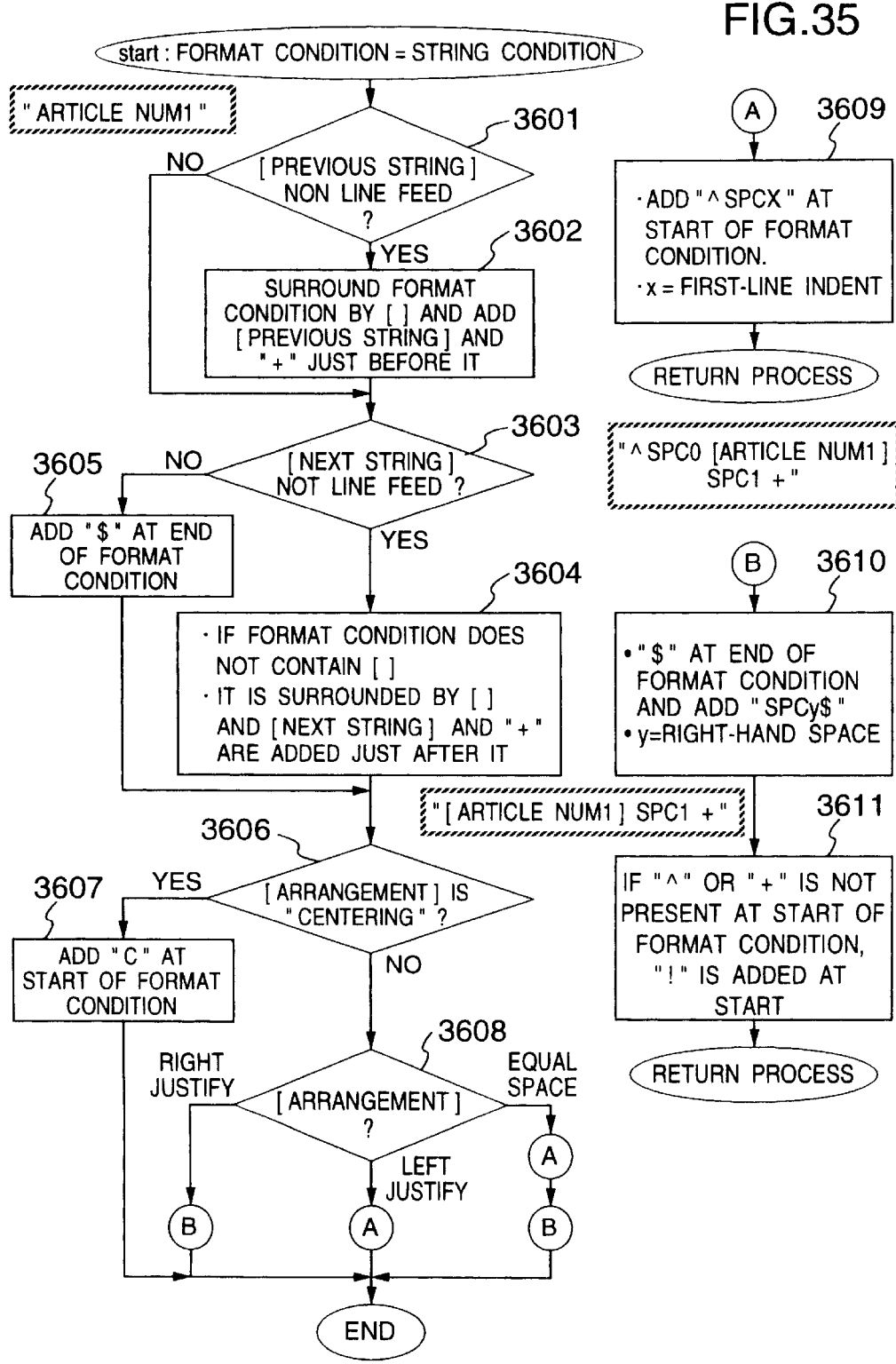
FIG. 35 is a flow chart illustrating the process of generating a format condition.

After the required item contents are edited and all the required item contents match the description format of the non-structured document, the operator clicks an exit button 3402 to instruct the termination of the processes of the supplementary information editing module 2209. The supplementary information editing module 2209 generates the format conditions from the edited required item contents of the string-corresponding elements set as the keyword-corresponding elements (3506), and passes the format conditions as the return argument to the keyword information indicator module 2208 (3507). The process flow of generating the format condition from the required item content is shown in FIG. 35. This process flow is added with an example of steps surrounded by a broken line in FIG. 35 which step converts the required item content of "ARTICLENO." shown under the title of "after entering string condition" into the format condition.

First, the content (e.g., "ARTICLE"NUM1) of the required item [string condition] is substituted into the format condition, and it is checked whether the content of the required item [previous string] is line feed (3601). If line feed, the flow advances to step 3603, whereas if not, the format condition is surrounded by "[" and "]" and "+" and the content of the [previous string] are added just before it (3602). In this case, a blank is converted into SPC [integer]. Next, at step 3603 it is checked whether the content of the required item [next string] is line feed. If line feed, "$" is added to the end of the format condition (3605) and the flow advances to step 3606, whereas if not, the format condition is surrounded by "[" and "]" if the format condition does not contain "[" and "]" and the content of the [next string] and "+" are added just after it (3604, e.g., ["ARTICLE"NUM1 SPC1+]). At step 3606 it is checked whether the content of the required item [arrangement] is "centering" or not. If "centering", "C" is added to the start of the format condition (3607) and the generation of the format condition is terminated. If not "centering", the flow advances to step 3608 and the process A or B is executed depending upon the content of the [arrangement]. If the content of the [arrangement] is "left justify", the process A is performed, if "right justify", the process B is performed, and if "equal space", both the processes A and B are performed, to thereafter terminate the generation of the format condition. In the process A, "SPCx" is added to the start of the format condition (3609) where x is the content of the [first-line indent] (e.g., ^SPC0 ["ARTICLE"NUM1] SPC1+). In the process B, first "SPCy$" is added to the end of the format condition (3610) where y is the content of the [right-hand space. Next, if "^" or "+" at the start of the format condition, "!" is added to the start of the format condition (3611).

The supplementary information editing module 2209 passes the obtained format condition as the return argument to the keyword information indicating module (3507 in FIG. 34) which in turn executes the process. The above description is the contents of the processes by the supplementary information indicating module 2209.

Figure 36:
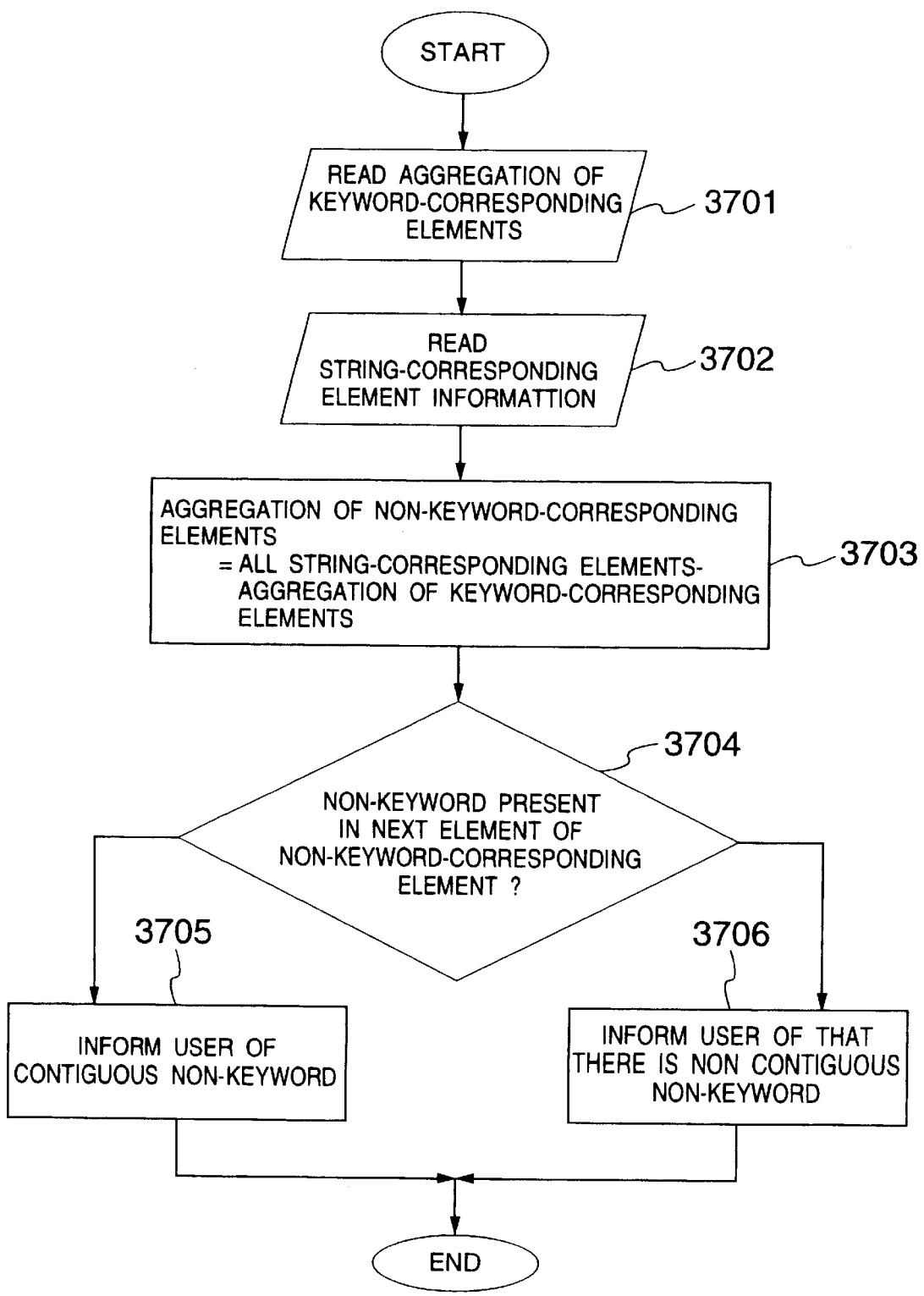
FIG. 36 is a flow chart illustrating the processes to be executed by a contiguous element checking module.
Figure 37:
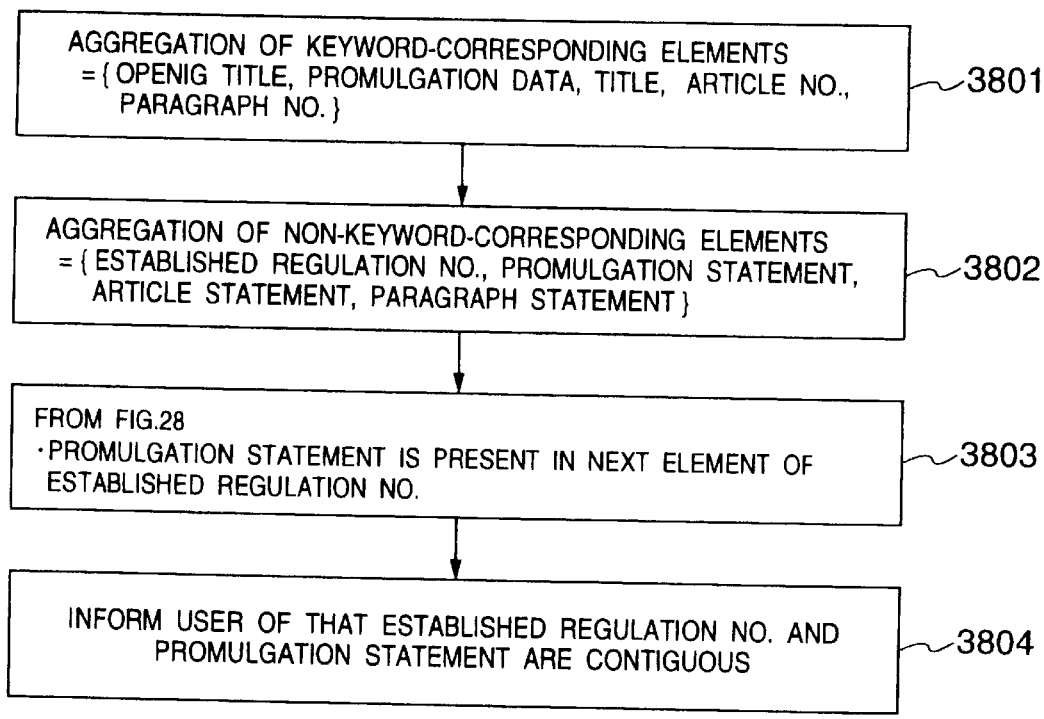
FIG. 37 is a diagram showing an example of the results processed by the contiguous element checking module.

FIG. 36 shows the process flow of the contiguous element checking module 2210 activated when the contiguity check button is clicked during the operation of the keyword information indicating module (2208 in FIG. 21), and FIG. 37 shows an example of its processes. The contiguous element checking module 2210 first reads the keyword-corresponding element given by the keyword information indicating module 2208 (3701, e.g., 3801). Next, it reads the string-corresponding element information (2203 in FIG. 21) (3702). Then, non-keyword-corresponding elements are obtained as an aggregation of all string-corresponding elements subtracted by the keyword-corresponding elements (3703, e.g., 3802). At step 3704, by referring to the string-corresponding element information, it is checked whether there is a non-keyword corresponding element in the next element of another non-keyword-corresponding element (e.g., 3803). If there is such a non-keyword corresponding element, the operator is informed of the contiguous non-keyword-corresponding element (3705, e.g., 3804) to thereafter terminate the process. If there is not, the operator is informed of such effect (3706) to thereafter terminate the process. The above description is the process contents of the contiguous element checking module 2210.

With this embodiment, the keyword extraction rule can be generated. The programs described with this embodiment may be stored in a storage such as a hard disk, a floppy disk, an optical disk, and a CD-ROM.

What is claimed is:

1. A method of generating a structured document for a structured document generating apparatus having at least an input/output device, a control unit, and a repository wherein a non-structured document not explicitly given the document structure and input from said input/output device is converted into a structured document explicitly given the document structure, in accordance with a document structure definition defining the document structure, said method comprising the steps of:

modifying a given first document structure definition so as to match the document structure of said input non-structured document and generate a second document structure definition;

by said control unit, generating a parsing rule used for performing a parsing process suitable for the document structure of said second document structure definition, by modifying marks constituting said second document structure definition and modifying said second document structure definition so as to make the positional order of said marks in one-to-one correspondence;

in accordance with said generated parsing rule, generating a first structured document from said non-structured document; and in accordance with difference data between said first document structure definition and said second document structure definition, converting said generated first structured document into a format matching said first document structure definition to thereby generate a second structured document.

2. A method of generating a structured document according to claim 1, wherein said first and second document structure definitions include mark trains disposed for defining the relationship between character strings constituting a document to be input.

3. A method of generating a structured document according to claim 2, wherein said parsing rule is generated by embedding a process of explicitly giving the parsed portion of document structure to be parsed, into an interim rule generated by converting said second document structure definition in accordance with a given rule conversion regulation.

4. A method of generating a structured document according to claim 2, wherein the mark strings of said first and second document structure definitions describe the document structure, representing a conceptional relationship between the character strings of a document to be input, by disposing names representing the concept of each character string.

5. A method of generating a structured document according to claim 2, further comprising the steps of:

extracting a keyword from said non-structured document in accordance with a predetermined rule regarding the character strings of a document to be input, and generating a keyword/text model including at least character strings extracted as keywords and other character strings; and converting said keyword/text model into said first structured document by using said parsing rule.

6. A method of generating a structured document according to claim 5, wherein if the same character string in the same character region is extracted as a plurality of keywords, said control unit selects a proper one from the plurality of keywords in accordance with whether the parsing process succeeds or fails.

7. A method of generating a structured document according to claim 5, wherein said keyword is extracted by analyzing each character string in said non-structured document with reference to a keyword extraction rule having a correspondence between a format condition of each character string and a keyword name.

8. A method of generating a structured document according to claim 7, wherein said keyword extraction rule is generated, if a layout definition of said non-structured document is given, by modifying said layout definition in accordance with a predetermined rule.

9. A storage device storing a program realizing a process executable by a computer, the process comprising the steps of:

> modifying a given first document structure definition so as to match the document structure of an input non-structured document and generate a second document structure definition;
>
> a control unit generating a parsing rule used for performing a parsing process suitable for the document structure of said second document structure definition, by modifying marks constituting said second document structure definition and modifying said second document structure definition so as to make the positional order of said marks in one-to-one correspondence;
>
> in accordance with said generated parsing rule, generating a first structured document from said input non-structured document; and
>
> in accordance with difference data between said first document structure definition and said second document structure definition, converting said generated first structured document into a format matching said first document structure definition to thereby generate a second structured document.

* * * * *